US010469599B2

(12) United States Patent
Yoden

(10) Patent No.: US 10,469,599 B2
(45) Date of Patent: Nov. 5, 2019

(54) AUTOMATIC SETTING UP OF APPLICATION PROGRAM IN PORTABLE COMPUTING DEVICE

(71) Applicant: Koji Yoden, Tamba (JP)

(72) Inventor: Koji Yoden, Tamba (JP)

(*) Notice: Subject to any disclaimer, the term of this patent is extended or adjusted under 35 U.S.C. 154(b) by 105 days.

(21) Appl. No.: 15/657,223

(22) Filed: Jul. 24, 2017

(65) Prior Publication Data
US 2018/0041591 A1 Feb. 8, 2018

Related U.S. Application Data

(60) Provisional application No. 62/371,208, filed on Aug. 4, 2016.

(51) Int. Cl.
| | |
|---|---|
| H04L 29/06 | (2006.01) |
| H04L 29/08 | (2006.01) |
| H04B 1/3827 | (2015.01) |
| G06F 8/61 | (2018.01) |
| H04L 12/28 | (2006.01) |
| H04W 4/50 | (2018.01) |
| H04W 84/12 | (2009.01) |
| H04W 84/18 | (2009.01) |
| H04W 8/00 | (2009.01) |

(52) U.S. Cl.
CPC ............ *H04L 67/16* (2013.01); *G06F 8/61* (2013.01); *H04B 1/3827* (2013.01); *H04L 12/2809* (2013.01); *H04L 12/2814* (2013.01); *H04L 67/125* (2013.01); *H04L 67/32* (2013.01); *H04W 4/50* (2018.02); *H04L 67/34* (2013.01); *H04W 8/005* (2013.01); *H04W 84/12* (2013.01); *H04W 84/18* (2013.01)

(58) Field of Classification Search
CPC ...................................................... H04L 67/16
See application file for complete search history.

(56) References Cited

U.S. PATENT DOCUMENTS

2016/0357524 A1* 12/2016 Maluf ..................... G06F 8/34
2018/0176009 A1* 6/2018 Agerstam ............ H04L 9/0841

* cited by examiner

*Primary Examiner* — Adnan M Mirza

(57) ABSTRACT

Automatic or autonomous setup of an application program (e.g., App01.exe) is disclosed. App01.exe is programmed or configured to be installed and run on a portable computing device for communicating with another computer program resident on an appliance over a close-range wireless communication. In some embodiments, upon discovery of the appliance on the close-range wireless communication, the portable computing device autonomously downloads App01.exe from the appliance over the close-range wireless communication. In some embodiments, the portable computing device performs the autonomous download of App01.exe only when App01.exe is not installed on the portable computing device. In some embodiments, the portable computing device autonomously downloads App01.exe over the Internet from a remote server computer that is accessible by the portable computing device with reference to the uniform resource identifier (URI) of the server computer that is provided by the appliance.

19 Claims, 33 Drawing Sheets

| ID | App01.exe |
|---|---|

FIG. 26A

| ID | App. Info. | App01.exe |
|---|---|---|

AUTOMATIC SETTING UP OF APPLICATION PROGRAM IN PORTABLE COMPUTING DEVICE

CROSS REFERENCE TO RELATED APPLICATIONS

This application claims the benefit of U.S. provisional patent application 62/371,208 filed on Aug. 4, 2016 and entitled "Automatic Setting Up of Application Program in Portable Computing Device", the content of which is incorporated herein by reference in its entirety.

TECHNICAL FIELD

The present disclosure relates to automatically setting up an application program in a portable computing device in wireless communication with an appliance.

BACKGROUND

There have been marketed portable computing devices such as personal computers (PCs), laptops, mobile phones, and tablets. Such portable computing device nowadays typically has communication circuitry for wireless communication in accordance with one or more close-range wireless communication standards. Such close-range wireless communication standards include IEEE 802.11 referred to as a wireless local area network (LAN) or Wi-Fi, and IEEE 802.15 referred to as a wireless personal area network (PAN). The wireless communication through such wireless LAN or PAN allows the portable computing device to connect to appliances separated from the portable computing device, such as a headset, headphone, printer, or other accessories or peripheral devices. Once connected together, the portable computing device and such other devices are able to communicate with each other to exchange data and/or control commands to implement various functions. For example, the portable computing device is able to send audio data to the connected headphone via the wireless communication when a media player is executed on the portable computing device, so that the headphone outputs the audio. In another example, the portable computing device is able to send a command for printing out a document to the connected printer via the wireless communication.

The present inventor is made to address improvement in wireless communication between the portable computing device and various appliances over wireless close-range communication network. In particular, aspects of the present invention provides improvement in setup of an application program designed to run on the portable computing device for communication between the portable computing device and the various appliances.

SUMMARY

According to aspects of the disclosure, a portable computing device and an appliance discover each other and wirelessly communicate with each other over a close-range wireless communication network. In the aspects, the close-range wireless communication network may be a wireless local area network (WLAN) or Wi-Fi in accordance with any one of IEEE 802.11 standards. In the aspects, the close-range wireless communication network may also be a wireless personal area network (WPAN) such as the Bluetooth and ZigBee in accordance with any one of IEEE 802.15 standards, a radio frequency identification (RFID) network, a near field communication (NFC) network, a ultrasonic communication network, an infrared (IR) communication network, and another short-range wireless communication network regardless of whether being defined in any one of IEEE standards.

In one aspect, upon discovering the appliance on the wireless communication network, the portable computing device may automatically set up an application program designed for communicating with the appliance. The portable computing device may communicate with the appliance through the application program over the wireless communication network, for example, for the portable computing device to remotely monitor or control the appliance.

In one aspect of the automatic application program set up, the portable computing device may automatically download and install the application program from the appliance over the wireless communication network to enable a user interface for launch of and access to the downloaded application program.

In one aspect of the automatic application program set up, the portable computing device may perform the automatic download and installation of the application program only when the portable computing device or a user of the portable computing device is determined to be authorized to use the application program. The determination of the authorization may be made based on identity information indicative of the identity of the portable computing device or the user that is locally stored in the portable computing device.

In one aspect, the application program may be preliminarily resident on a memory inside the appliance. In one aspect of the automatic application program set up, the portable computing device may first determine whether or not the application program is locally resident on the portable computing device. Upon determining negatively, the portable computing device may automatically download and install the application program from the appliance over the wireless communication network to enable a user interface for launch of and access to the downloaded application program.

In one aspect, the appliance preliminarily stores a uniform resource identifier (URI) indicative of an online remote server computer at which the application program is stored. In one aspect of the automatic application program set up, the portable computing device may receive the URI from the appliance over the wireless communication network. The portable computing device may then automatically download and install the application program from the remote server computer over the Internet with reference to the URI to enable a user interface for launch of and access to the downloaded application program.

In one aspect, the appliance preliminarily stores a uniform resource identifier (URI) indicative of an online remote server computer at which the application program is stored. In one aspect of the automatic application program set up, the portable computing device may first determine whether or not the application program is locally resident on the portable computing device. Upon determining negatively, the portable computing device may receive the URI from the appliance over the wireless communication network. The portable computing device may then automatically download and install the application program from the remote server computer over the Internet with reference to the URI to enable a user interface for launch of and access to the downloaded application program.

In one aspect, the enabling the user interface for launch of and access to the application program may include popping up an icon associated with the application program in a selectable manner on a screen, such as a home screen designed to list icons associated with accessible application programs, on a display of the portable computing device.

In one aspect, the enabling the user interface for launch of and access to the application program may include activating a microphone arranged on the portable computing device through which to receive a user voice command from the user.

In one aspect, once the user interface is enabled, the portable computing device may continuously monitor the presence of the appliance on the wireless communication network. Upon determining that the appliance is no longer present on the wireless communication network, the portable computing device may disable the user interface.

In one aspect, in case where the portable computing device and the appliance connect with each other via an access point (AP) that provides the wireless communication network, the portable computing device may disable the enabled user interface upon handing over to another access point causing disconnection with the appliance. The portable computing device may enable the user interface again upon handing over back to the AP resulting in re-connection with the appliance.

In one aspect, the disabling the user interface may include removing the icon off the screen, such as the home screen, on the display. In one aspect, the disabling the user interface may include changing the icon in the selectable manner into that in a non-selectable manner. The enabling the user interface again may include changing the icon back in the selectable manner.

In one aspect, the disabling the user interface may include deactivating the activated microphone of the portable computing device. The enabling the user interface again may include activating the microphone again.

DRAWINGS

Figure 6:
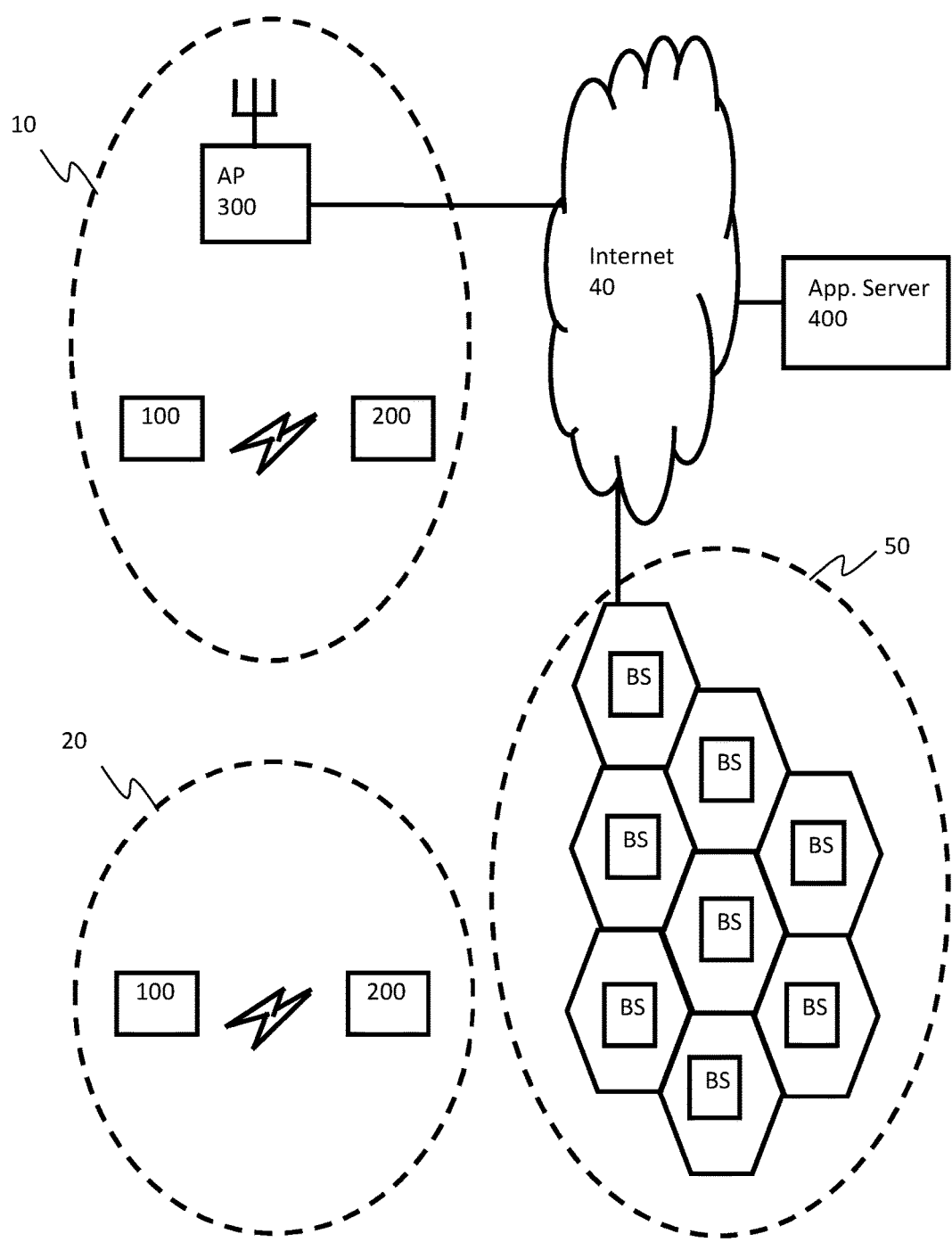

FIG. 6 illustrates the Internet network 40 and a cellular network 50 as well as the close-range wireless communication network 10 or 20.

Figure 7A:
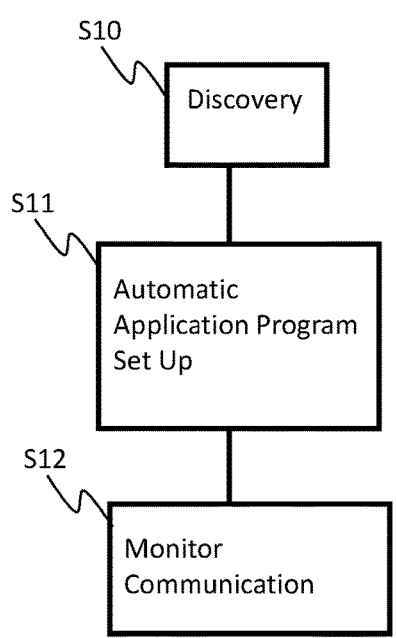

FIG. 7A is a flowchart illustrating an embodiment of processes performed by the portable computing device 100.

Figure 7B:
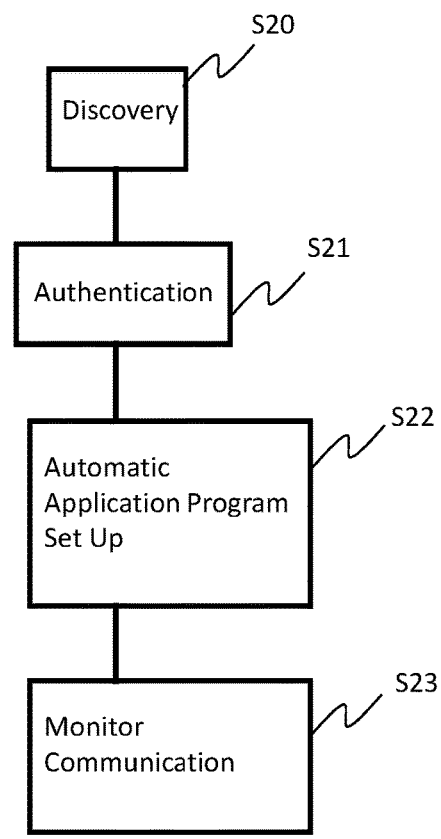

FIG. 7B is a flowchart illustrating an embodiment of processes performed by the portable computing device 100.

Figure 8:
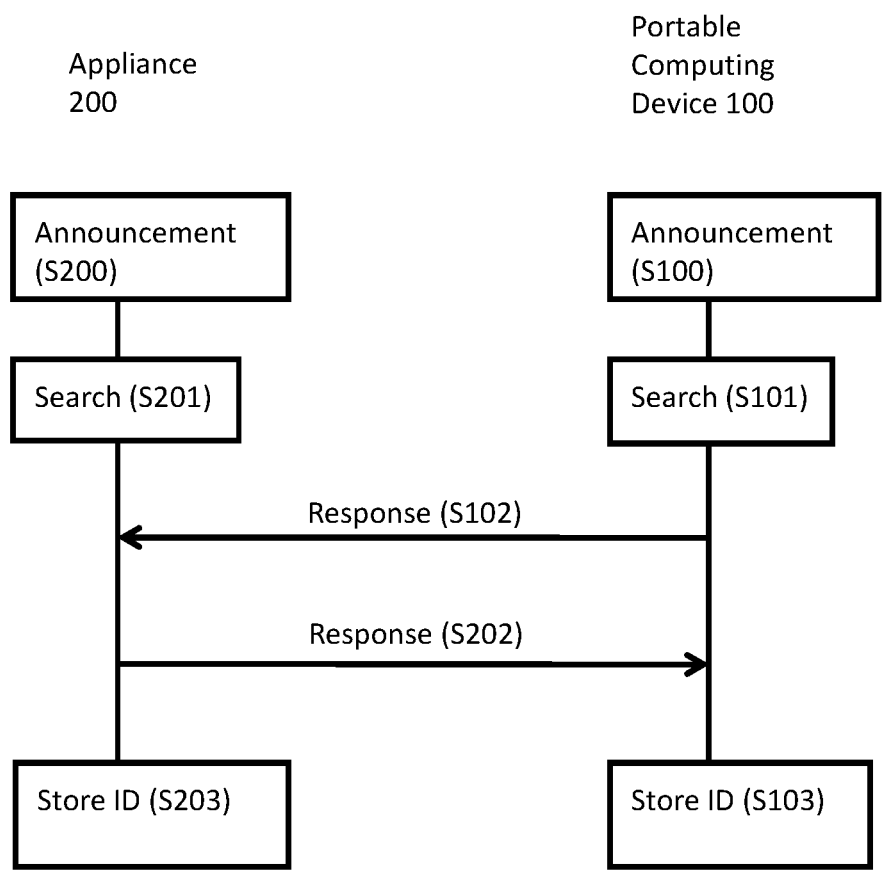

FIG. 8 is a flowchart illustrating a discovery process performed by and between the portable computing device 100 and the appliance 200 according to an embodiment.

Figure 9:
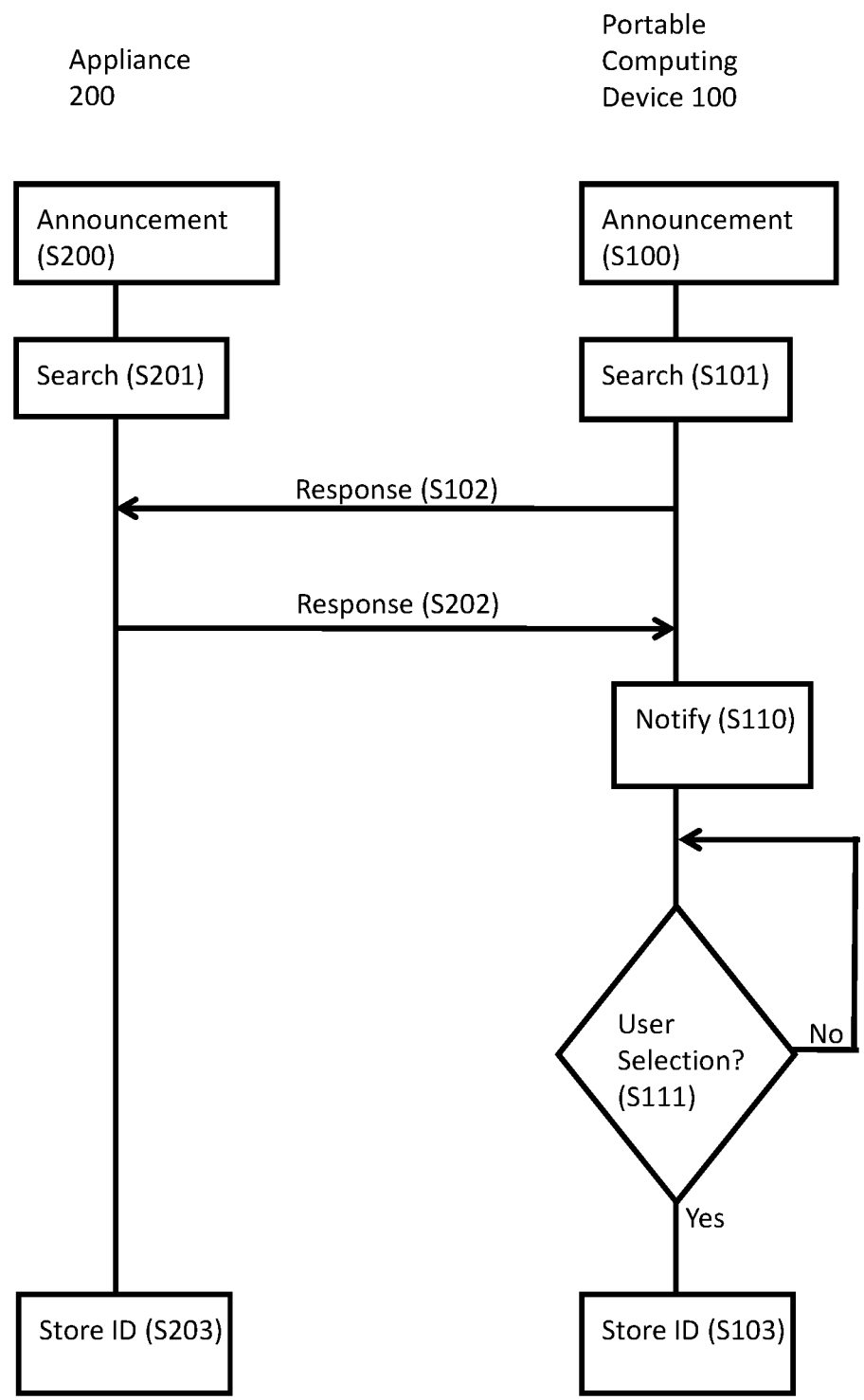

FIG. 9 is a flowchart illustrating a discovery process performed by and between the portable computing device 100 and the appliance 200 according to an embodiment.

Figure 10:
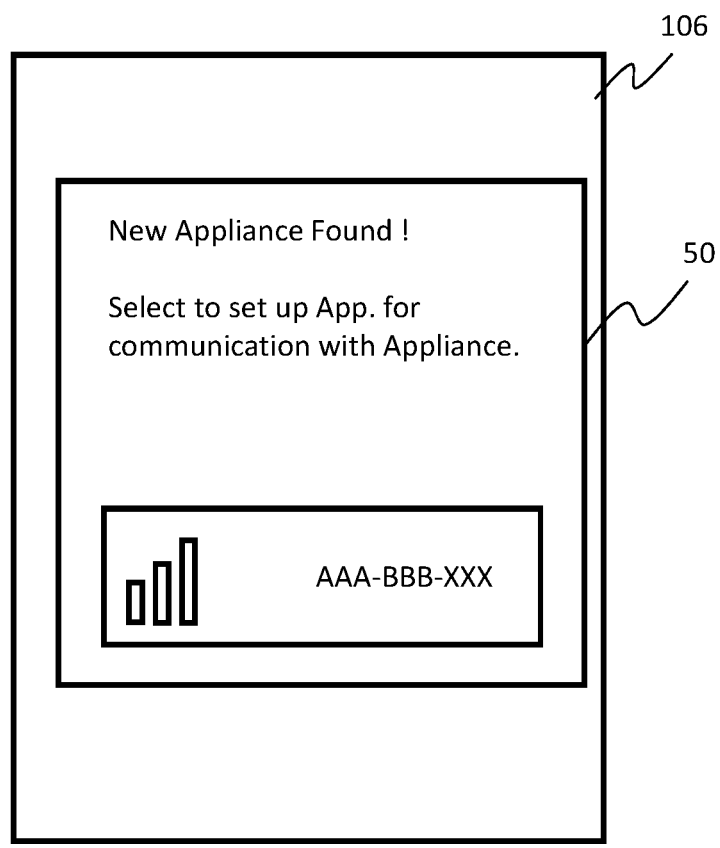

FIG. 10 illustrates an exemplary notification that is displayed at the portable computing device 100 in the discovery process according to an embodiment.

Figure 11:
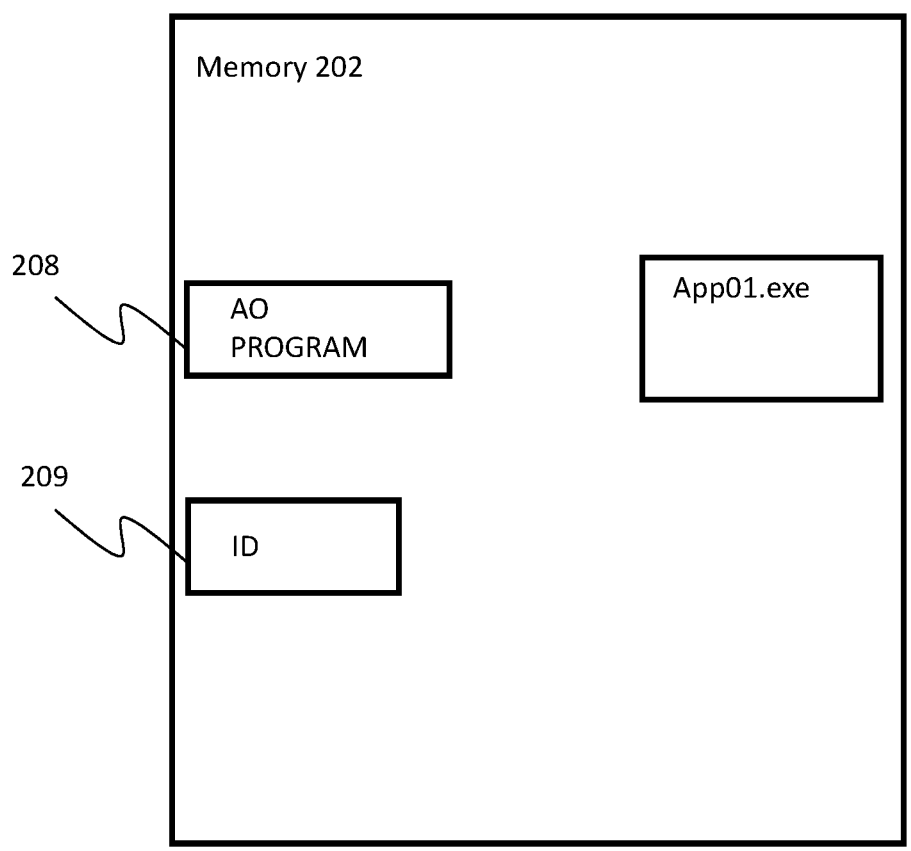

FIG. 11 illustrates what is stored on the memory 202 of the appliance 200 according to an embodiment.

Figure 12:
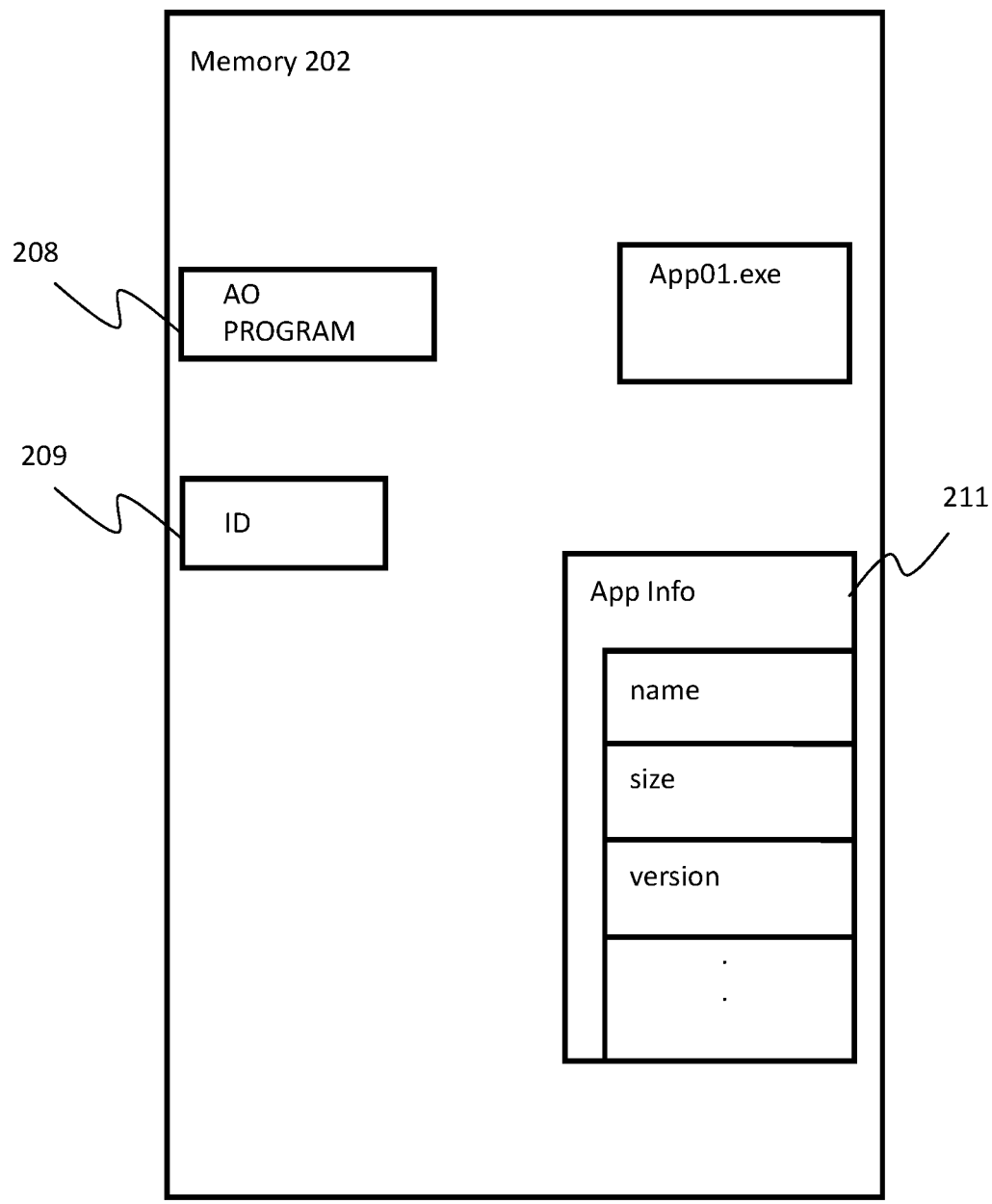

FIG. 12 illustrates what is stored on the memory 202 of the appliance 200 according to an embodiment.

Figure 13:
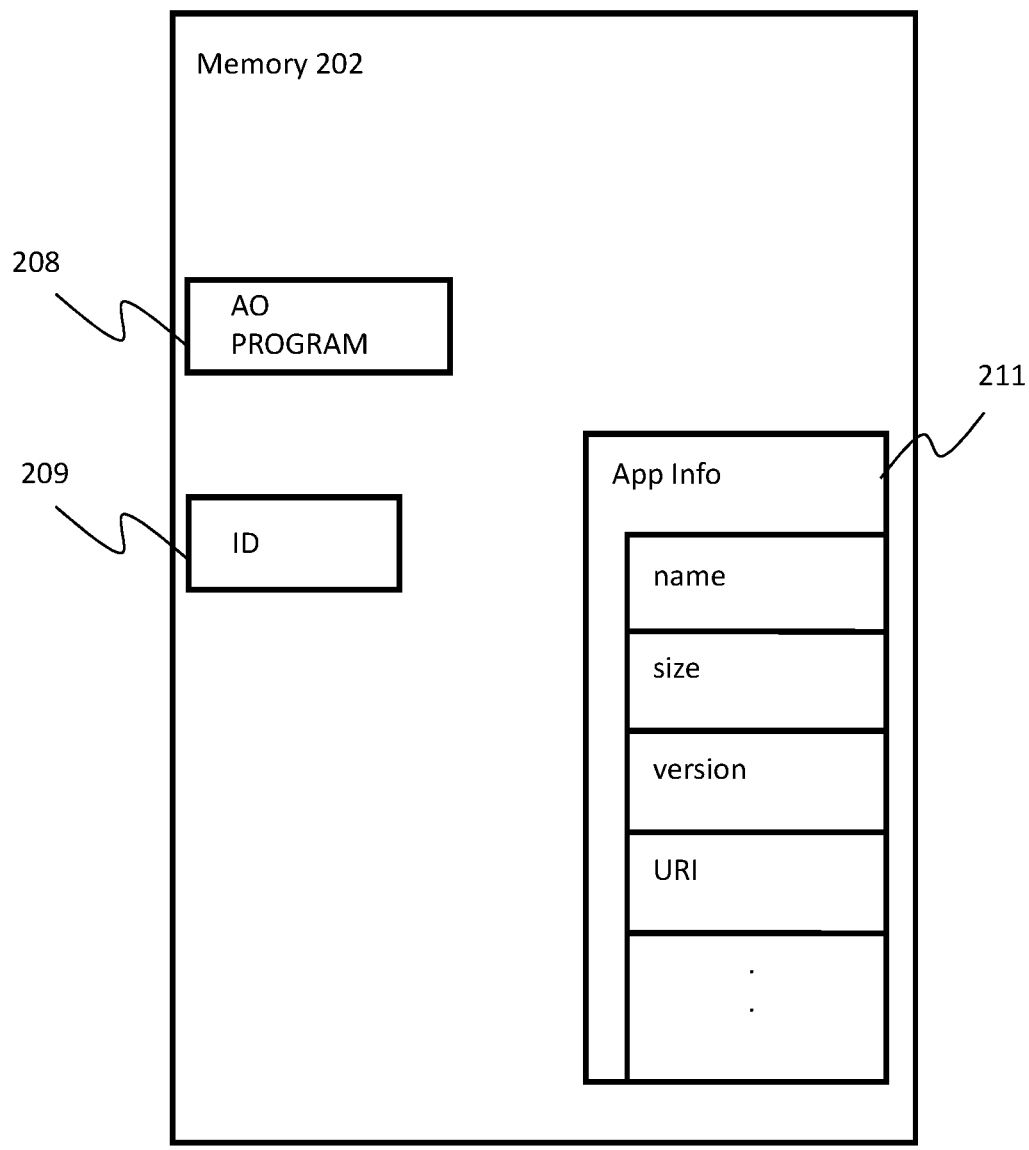

FIG. 13 illustrates what is stored on the memory 202 of the appliance 200 according to an embodiment.

Figure 14:
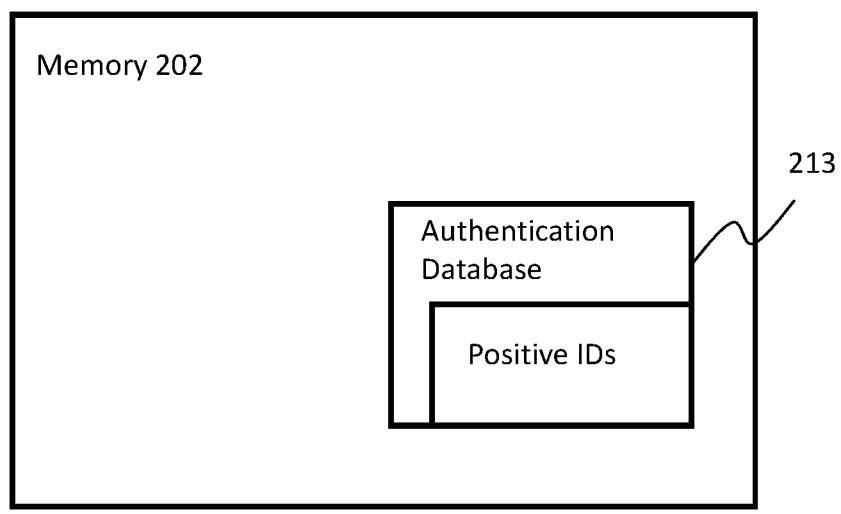

FIG. 14 illustrates what is stored on the memory 202 of the appliance 200 according to an embodiment.

Figure 15:
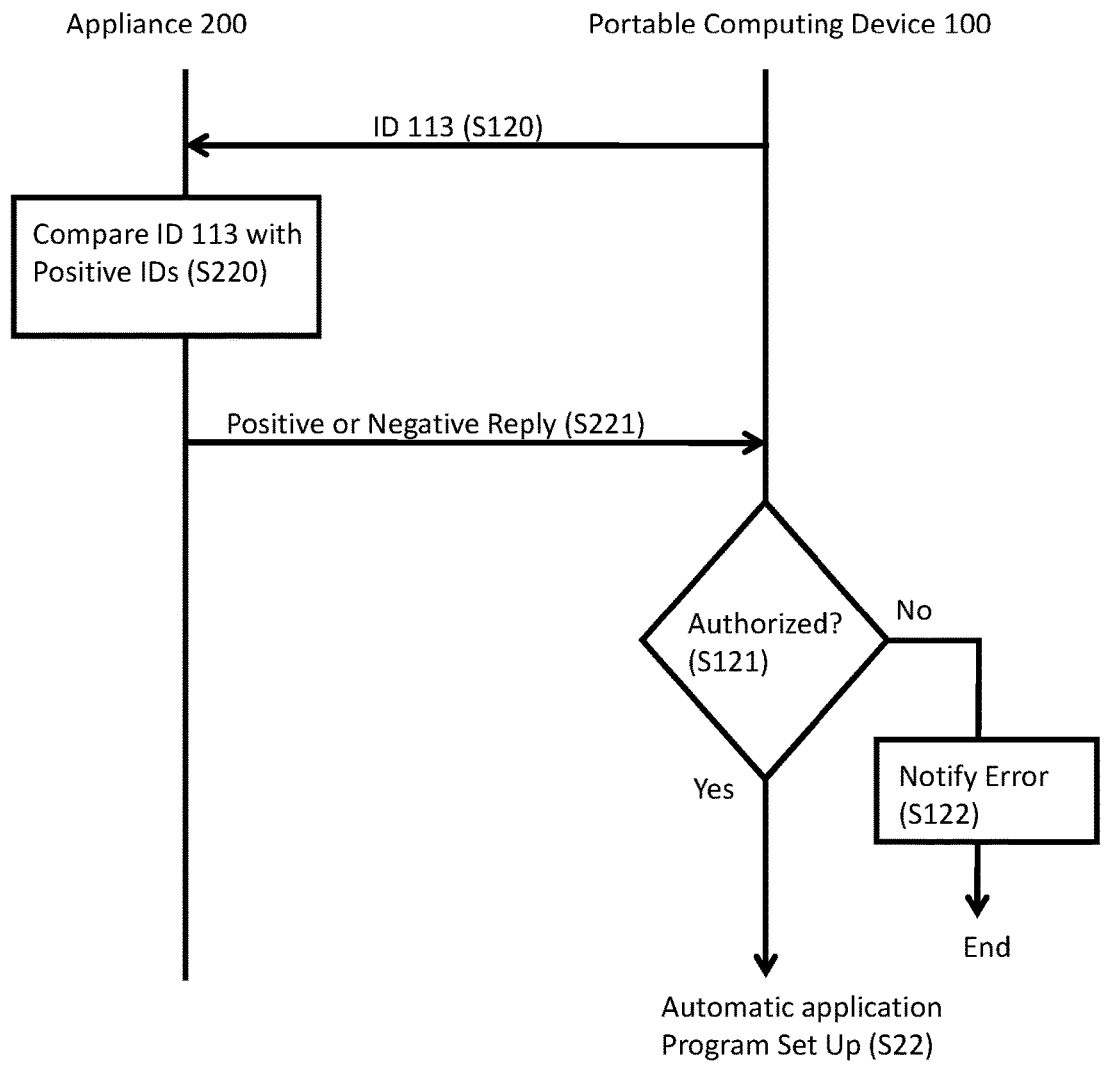

FIG. 15 is a flowchart illustrating an authentication process performed by and between the portable computing device 100 and the appliance 200 according to an embodiment.

Figure 16:
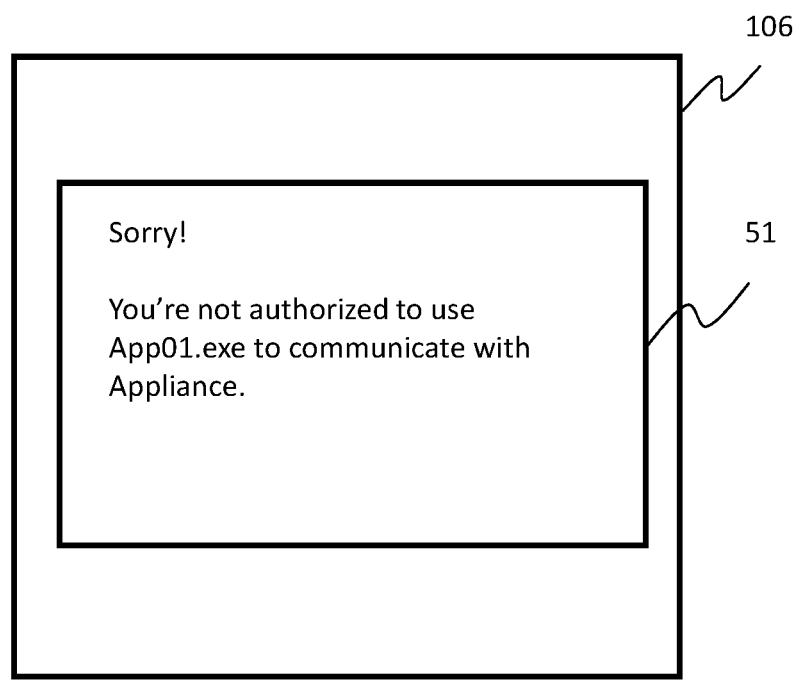

FIG. 16 illustrates an exemplary notification that is displayed at the portable computing device 100 in the authentication process according to an embodiment.

Figure 17:
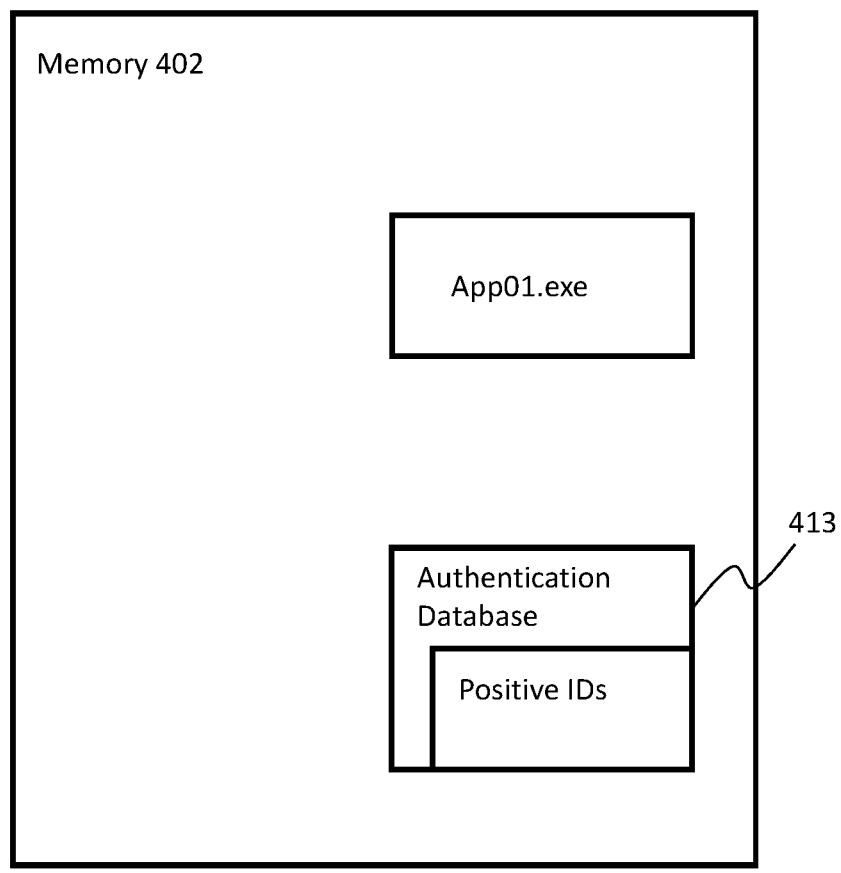

FIG. 17 illustrates what is stored on the server computer 400 according to an embodiment.

Figure 18:
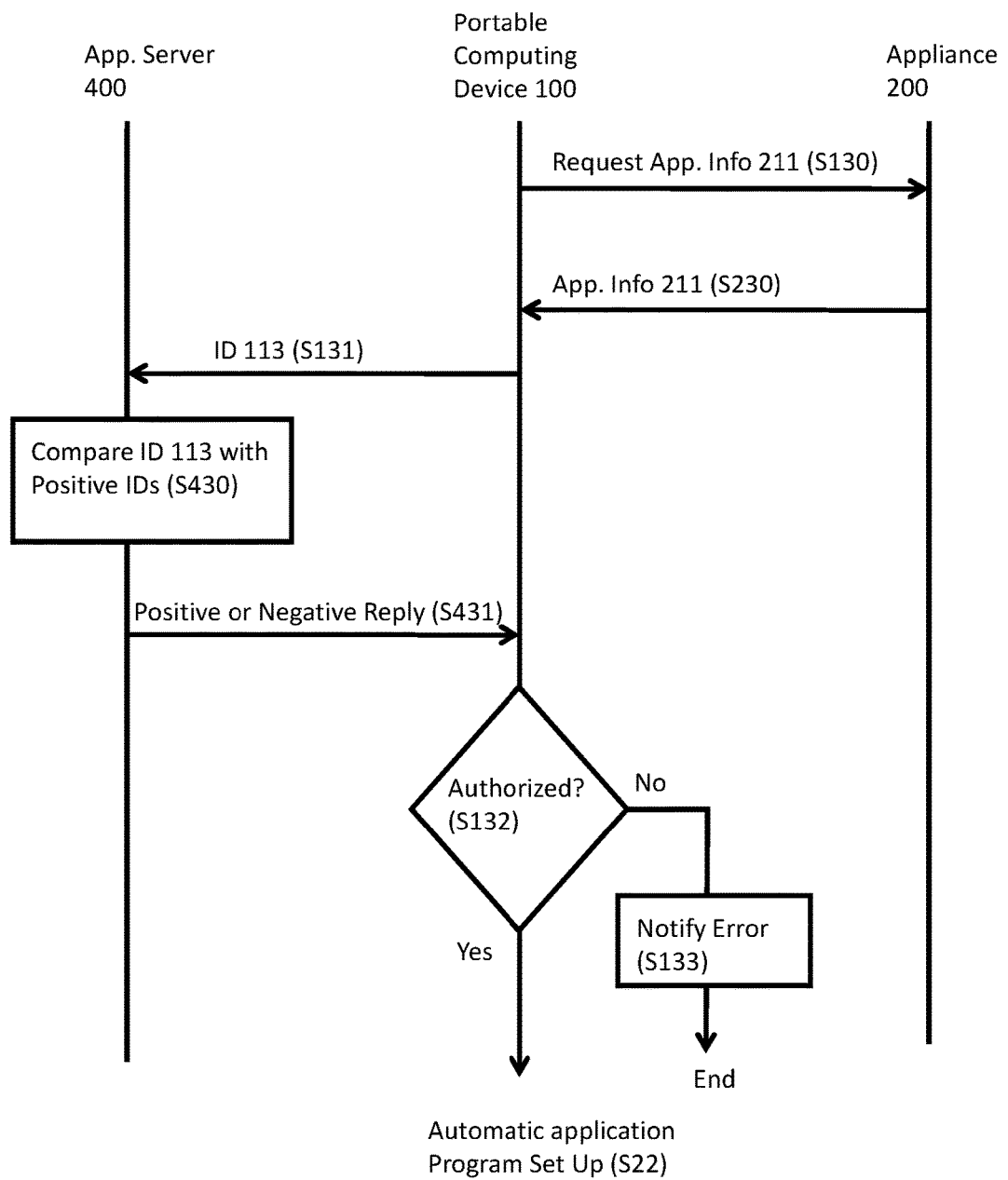

FIG. 18 is a flowchart illustrating an authentication process performed by and between the portable computing device 100 and the appliance 200 using the server computer 400 according to an embodiment.

Figure 19:
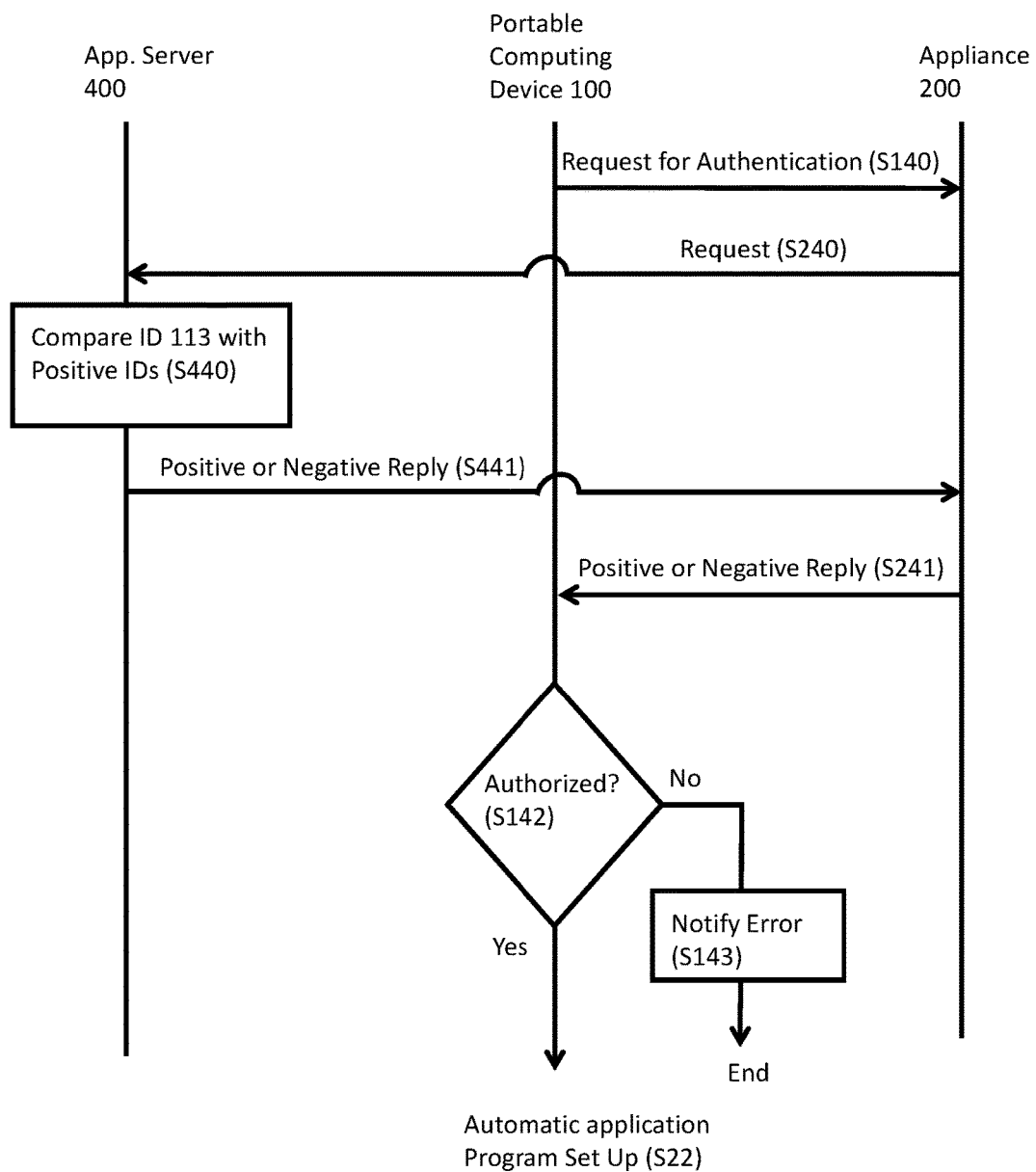

FIG. 19 is a flowchart illustrating an authentication process performed by and between the portable computing device 100 and the appliance 200 using the server computer 400 according to an embodiment.

Figure 20:
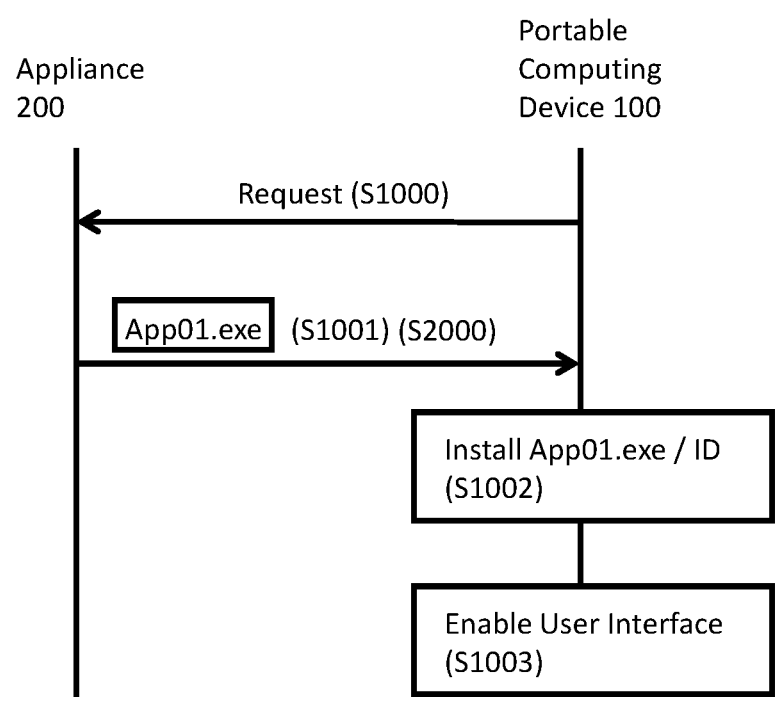

FIG. 20 is a flowchart illustrating an automatic application program set up process performed by and between the portable computing device 100 and the appliance 200 according to an embodiment.

Figure 21:
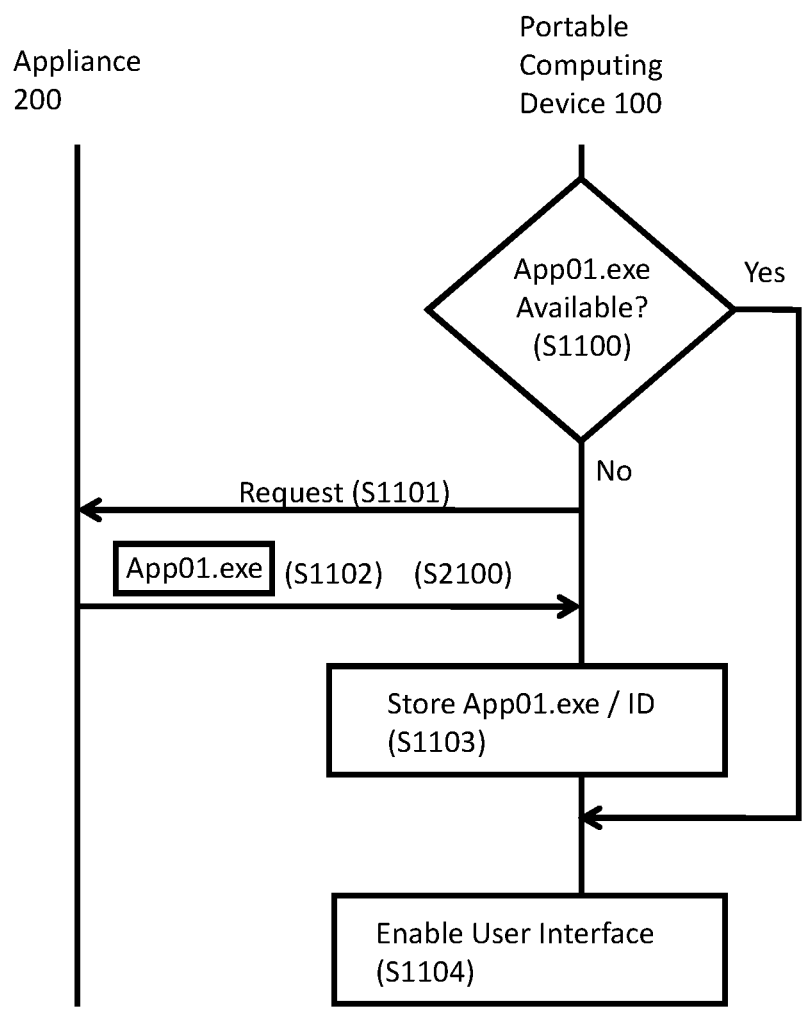

FIG. 21 is a flowchart illustrating an automatic application program set up process performed by and between the portable computing device 100 and the appliance 200 according to an embodiment.

Figure 22:
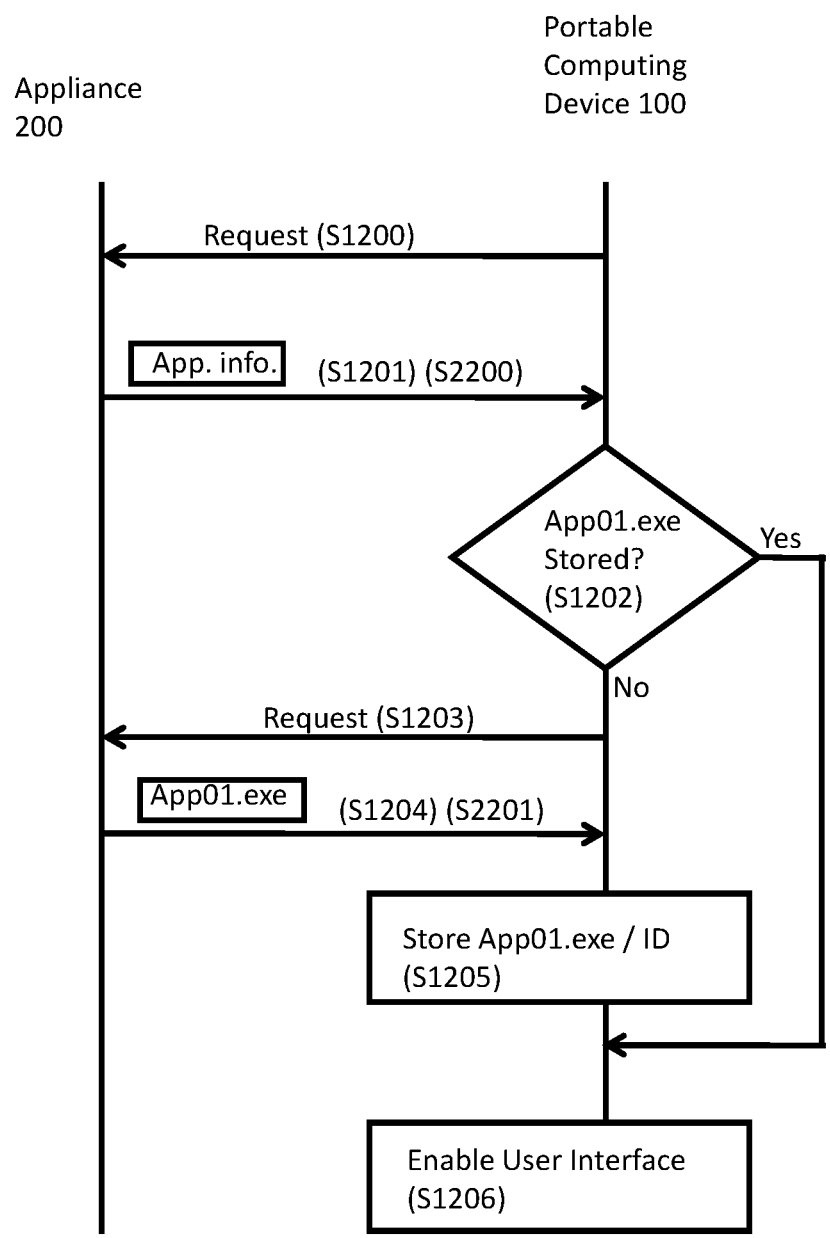

FIG. 22 is a flowchart illustrating an automatic application program set up process performed by and between the portable computing device 100 and the appliance 200 according to an embodiment.

Figure 23:
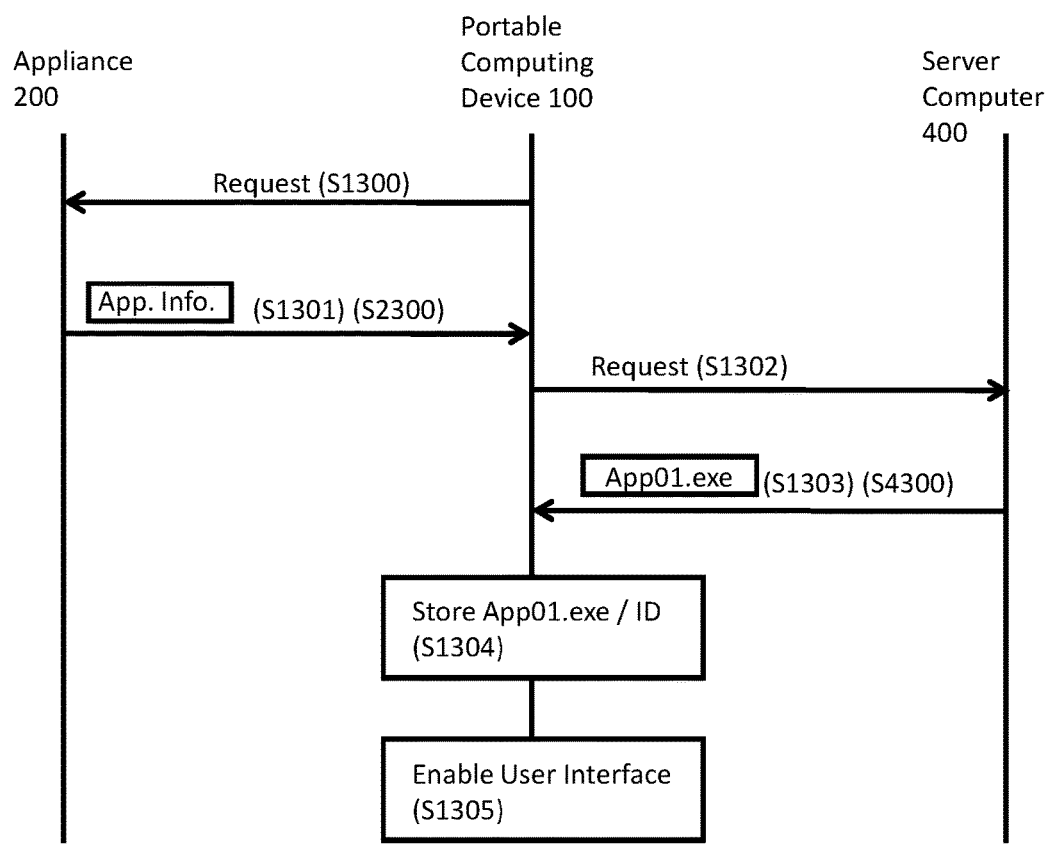

FIG. 23 is a flowchart illustrating an automatic application program set up process performed by and between the portable computing device 100, the appliance 200, and the server computer 400 according to an embodiment.

Figure 24:
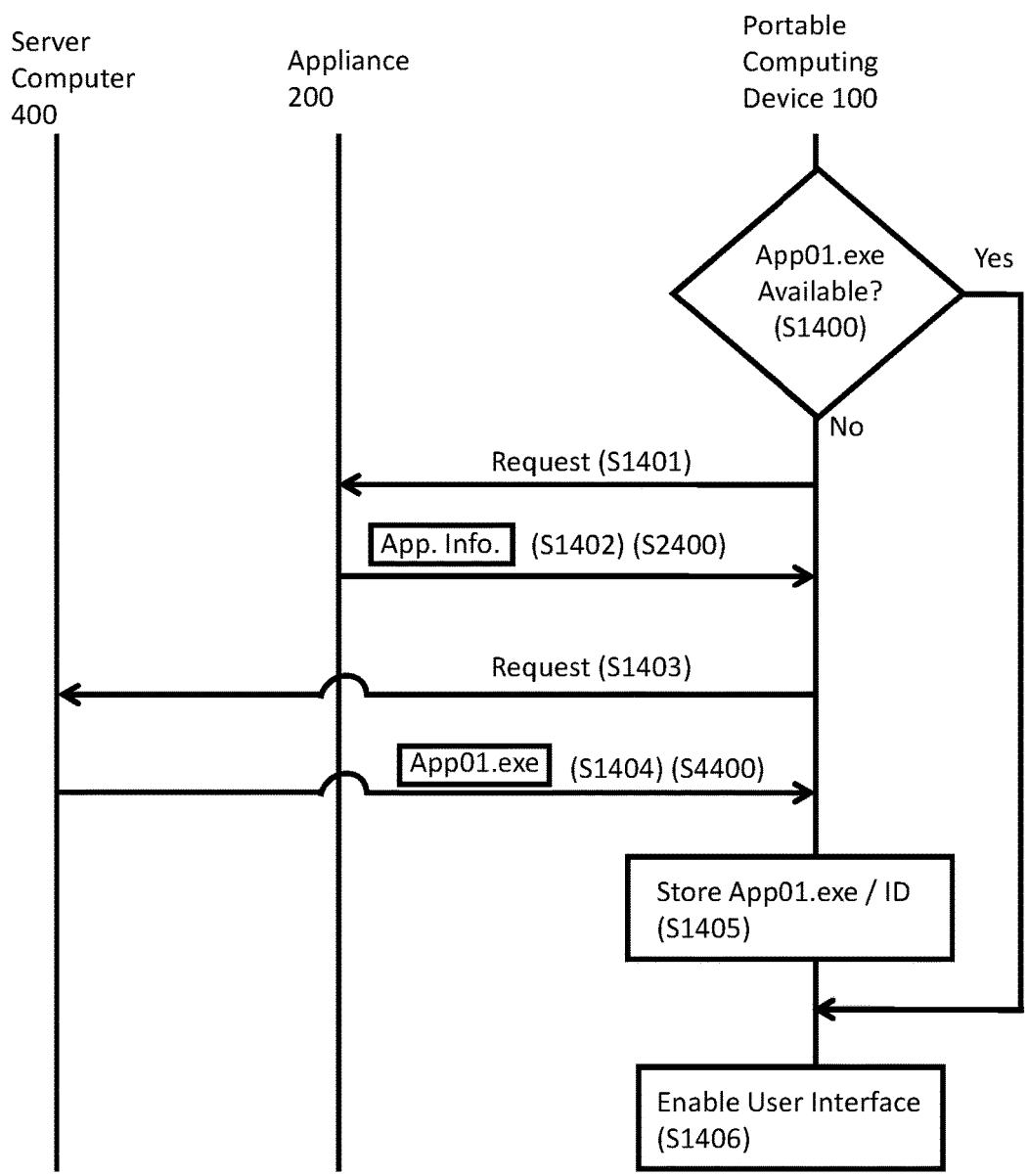

FIG. 24 is a flowchart illustrating an automatic application program set up process performed by and between the portable computing device 100, the appliance 200, and the server computer 400 according to an embodiment.

Figure 25:
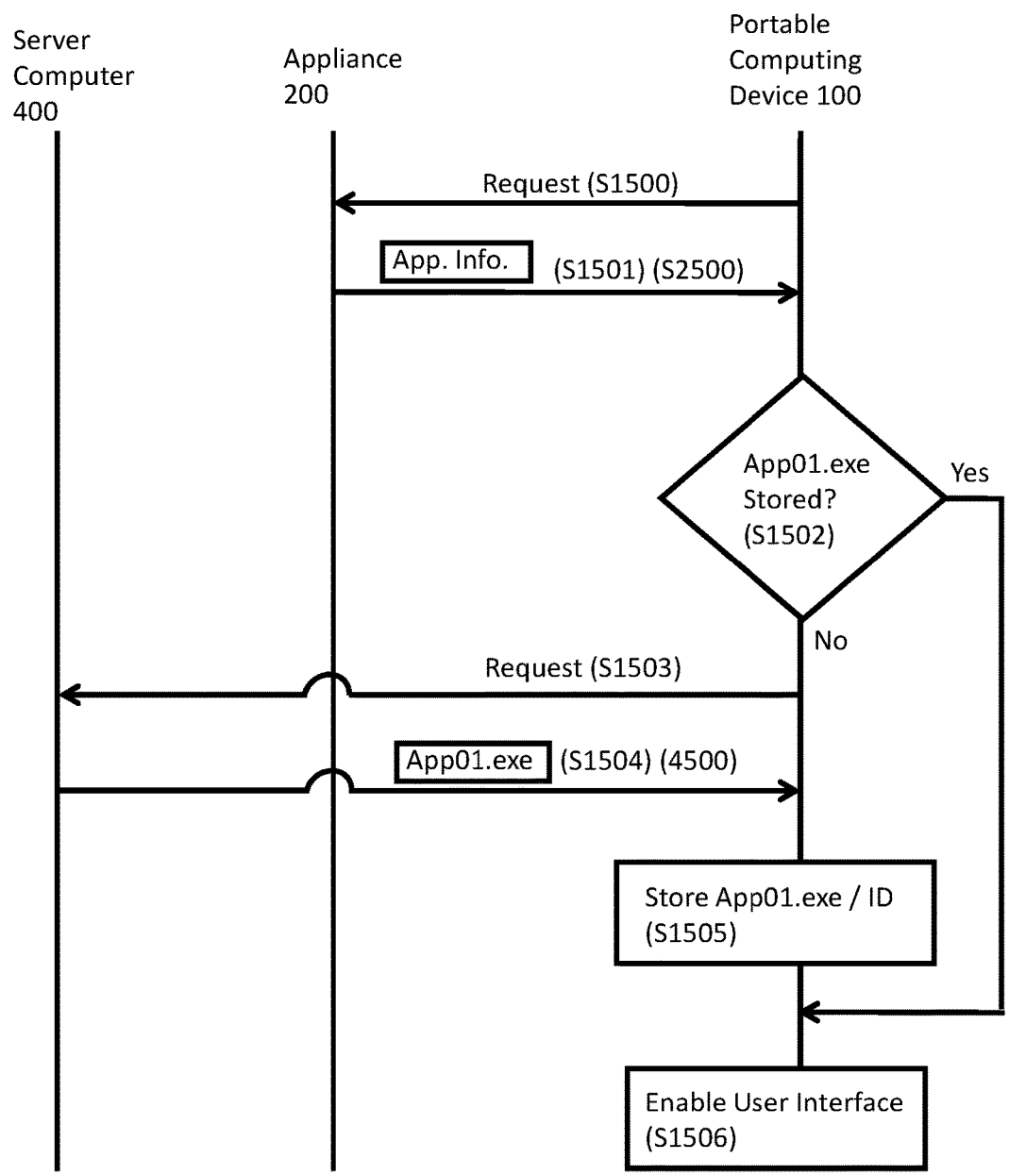

FIG. 25 is a flowchart illustrating an automatic application program set up process performed by and between the portable computing device 100, the appliance 200, and the server computer 400 according to an embodiment.

Figures 26A, 26B:
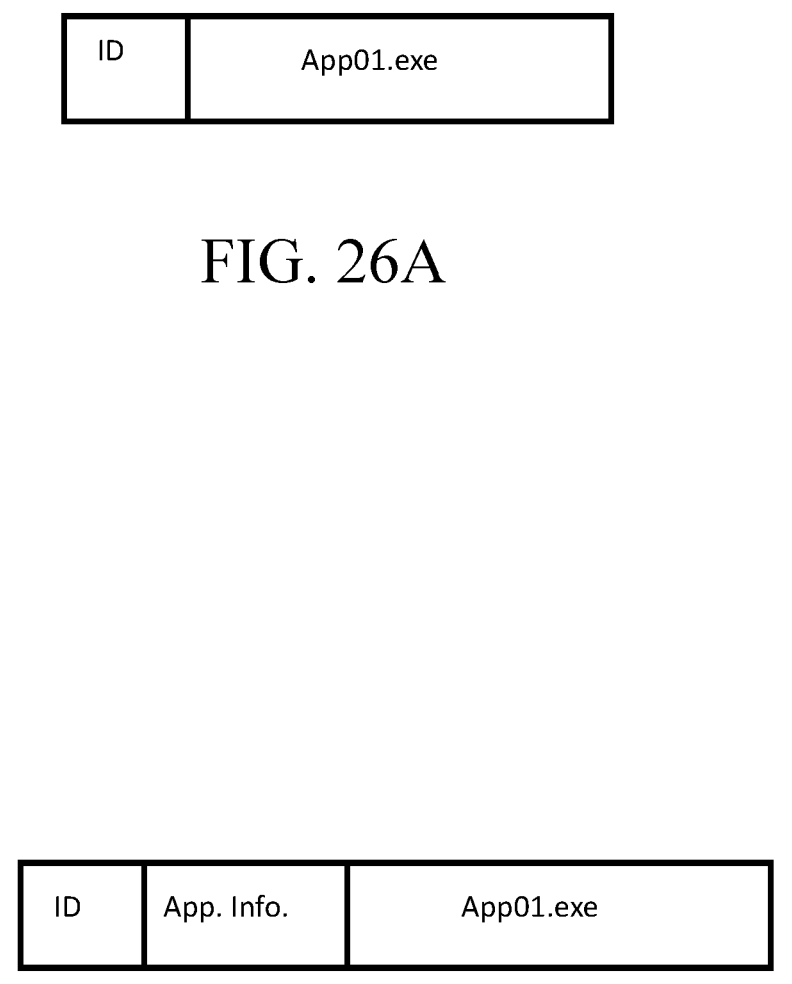

FIG. 26A illustrates the ID information and the application program (App01.exe) associated with one another and stored at the portable computing device 100 according to an embodiment.

FIG. 26B illustrates the ID information, application information (App.info.), and App01.exe associated with one another and stored at the portable computing device 100 according to an embodiment.

Figure 27:
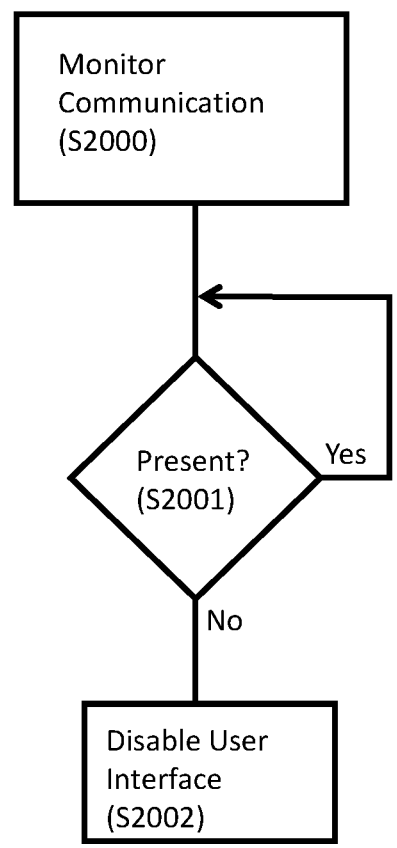

FIG. 27 is a flowchart illustrating an embodiment of the monitoring process performed by the portable computing dev9ce 100 according to an embodiment.

Figures 28A, 28B:
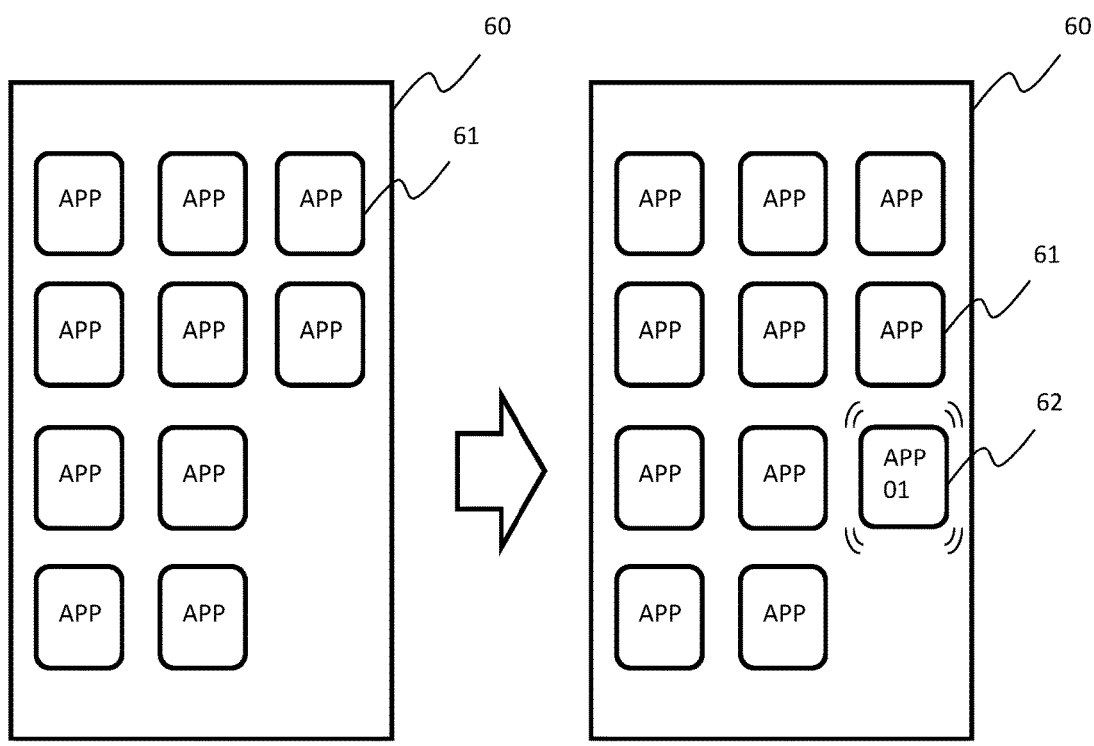

FIGS. 28A and 28B illustrate a change or transition in a screen displayed on a display 106 at the portable computing device 100 responsive to the enablement of a user interface for launch of and access to App01.exe, according to an embodiment.

Figures 29A, 29B:
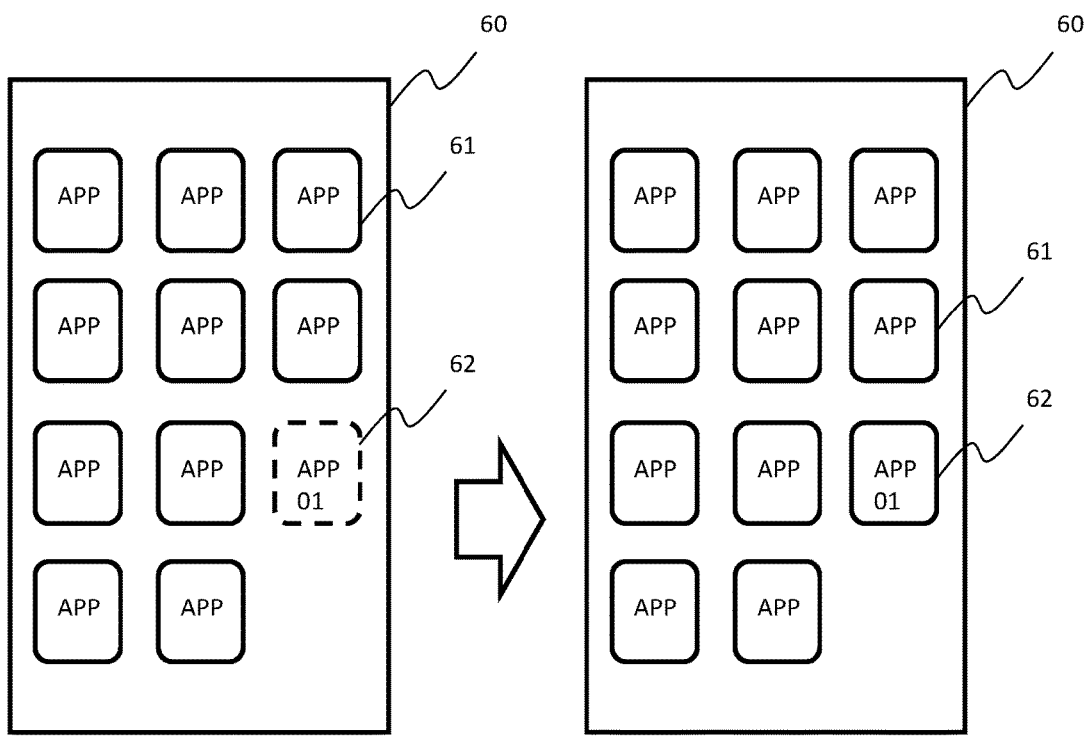

FIGS. 29A and 29B illustrate a change or transition in a screen displayed on a display 106 at the portable computing device 100 responsive to the enablement of a user interface for launch of and access to App01.exe, according to an embodiment.

Figure 30:
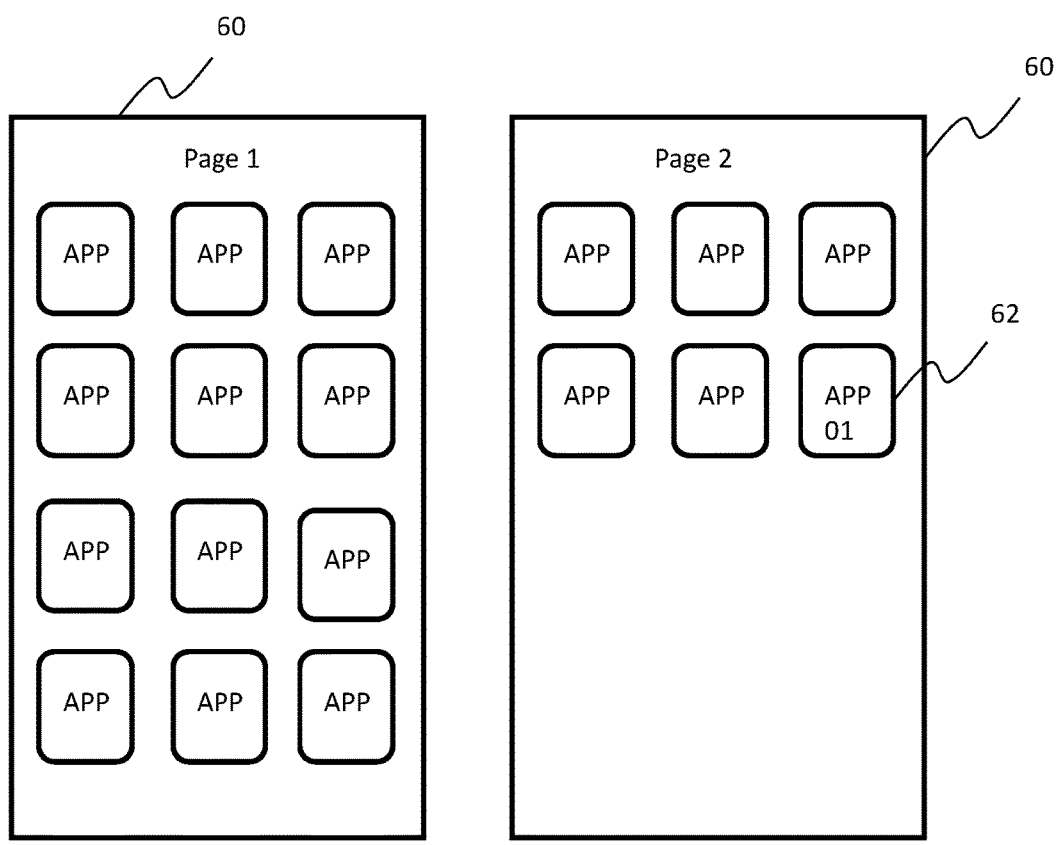

FIG. 30 illustrates a change or transition in a screen displayed on a display 106 at the portable computing device 100 responsive to the enablement of a user interface for launch of and access to App01.exe, according to an embodiment.

Figures 31A, 31B:
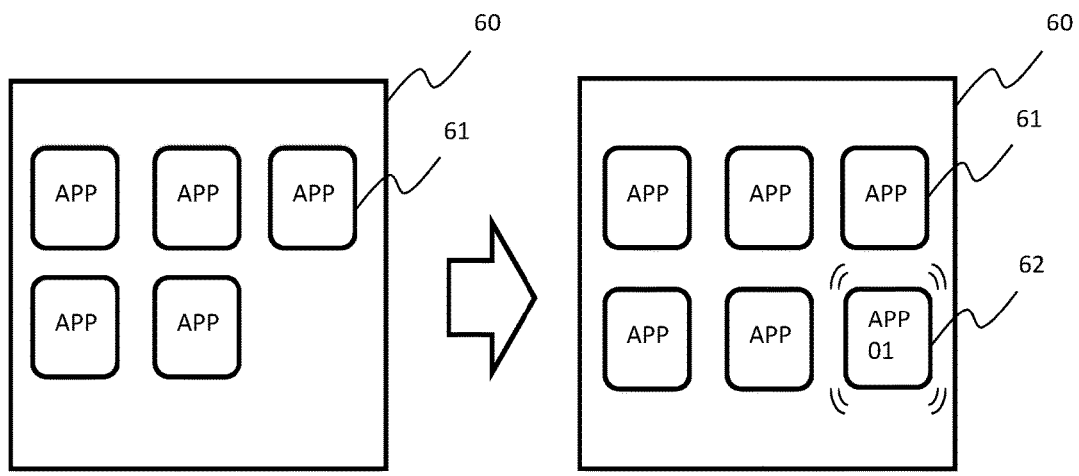
Figure 31C:
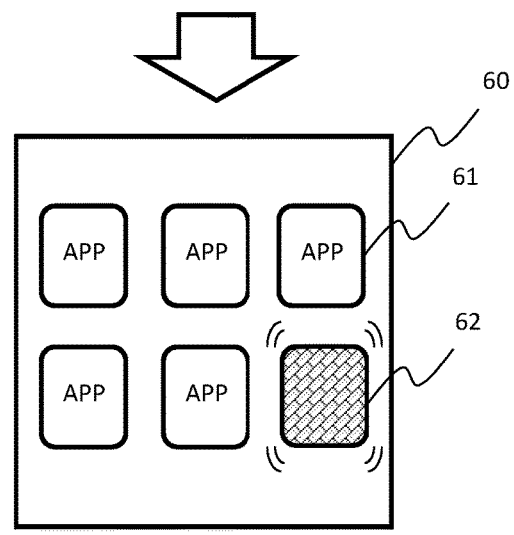

FIGS. 31A, 31B, and 31C illustrate a change or transition in a screen displayed on a display 106 at the portable computing device 100 responsive to discovery of the appliance 200 and the enablement of a user interface for launch of and access to App01.exe, according to an embodiment.

FIGS. 32A, 32B, 32C, and 32D illustrate a change or transition in a screen displayed on a display 106 at the portable computing device 100 responsive to discovery of the appliance 200, authentication, and the enablement of a user interface for launch of and access to App01.exe, according to an embodiment.

Figure 33:
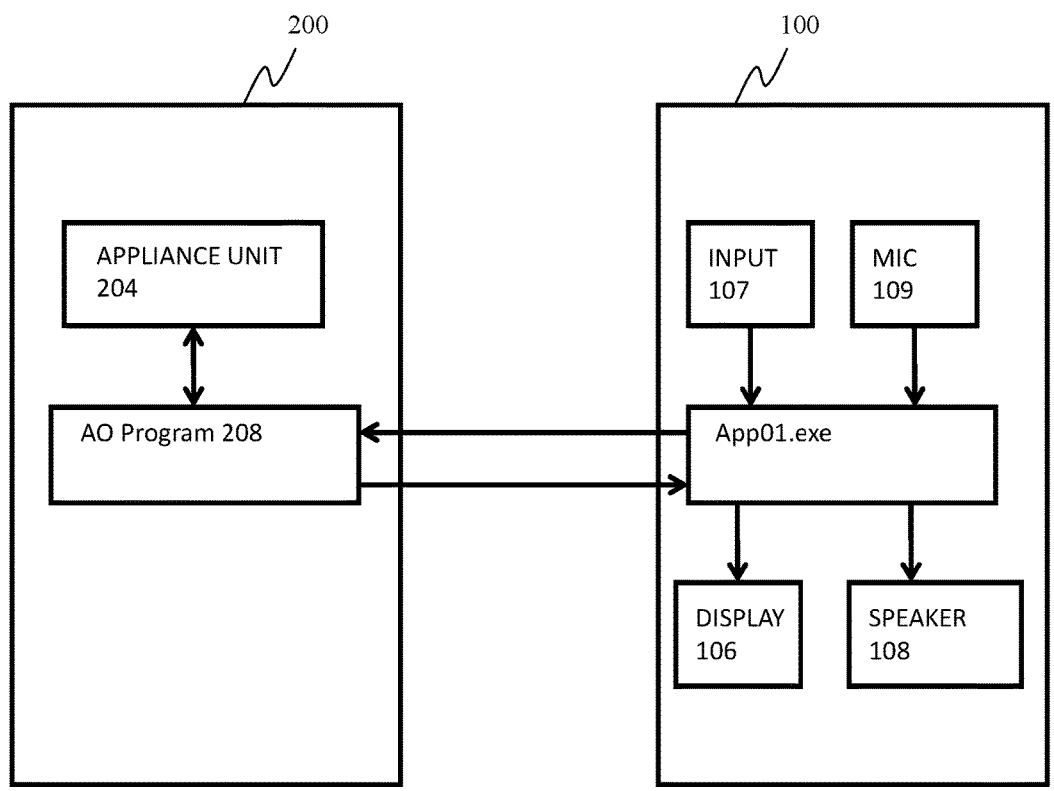

FIG. 33 schematically illustrates communication between App01.exe and AO program 208 according to an embodiment.

DETAILED DESCRIPTION

Summary

Embodiments of the present invention are described with reference to the drawings. The embodiments described herein are for illustrative purpose only and not intended to limit the scope of protection defined by Claims.

In the embodiments of the present invention, a system may include a portable computing device and an appliance that are communicatable with one another over wireless communication so that a user can use the portable computing device to monitor and/or control the operations of the appliance. The system may further include a server computer that is accessible by at least one of the portable computing device and the appliance.

Embodiments of the present invention provide one or more methods for smart setup of an application program designed to be installed and run on the portable computing device for the monitor and/or control of the operations of the appliance. The application program is hereinafter labeled "App01.exe" for illustration purpose only. App01.exe is programmed or configured to be installed on the portable computing device to communicate with another program (i.e., the after-mentioned AO program 208) resident on the appliance. The App01.exe includes computer program instructions for exchange of data and/or commands with the after-mentioned AO program 208 over a close-range wireless communication network, allowing for user experiences such as display of the status of the appliance on the portable computing device and control of the appliance by way of commands generated by the portable computing device.

Hardware

Figure 1:
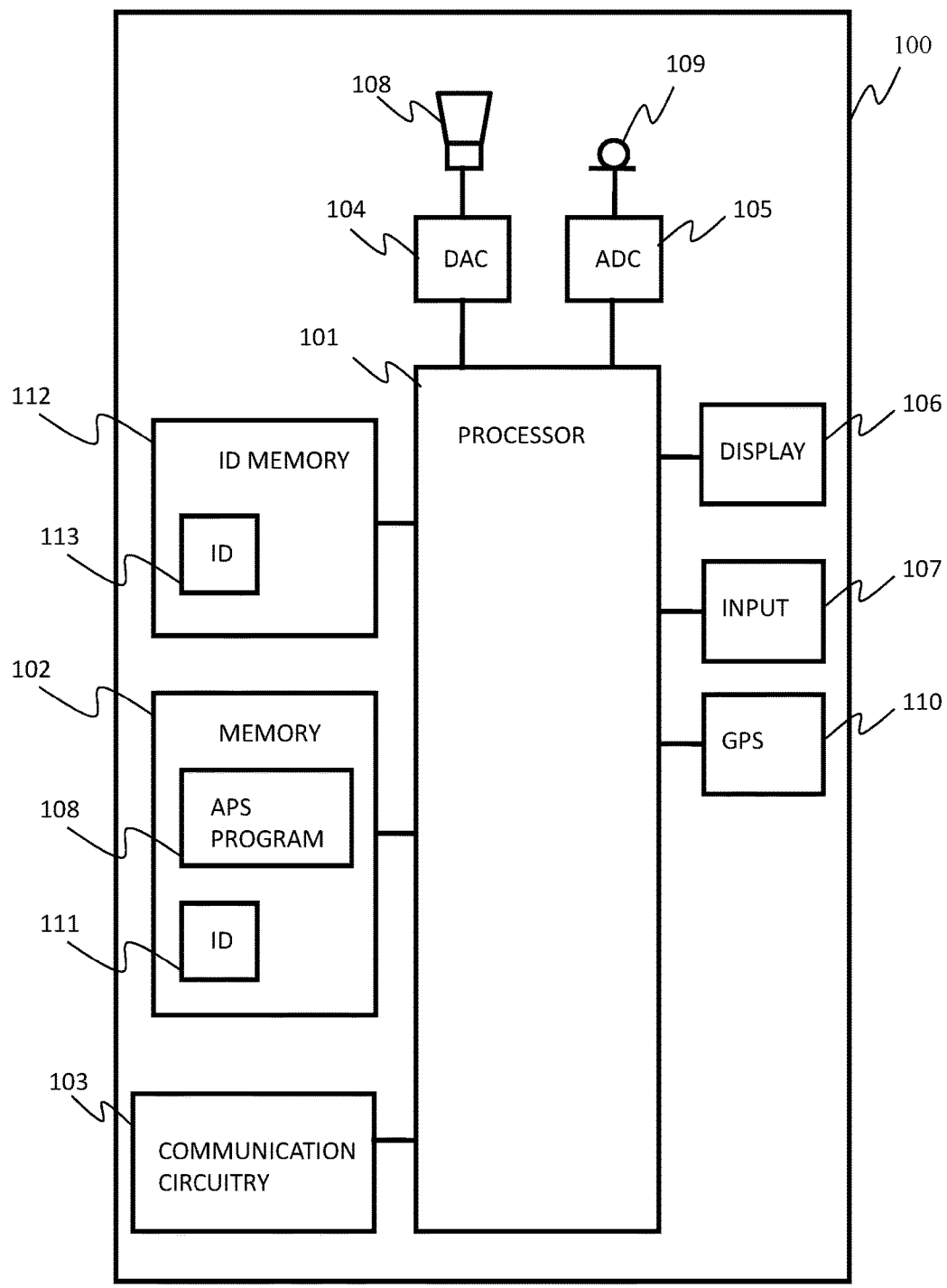
FIG. 1 is a block diagram illustrating hardware components and/or circuitry provided in a portable computing device 100 according to an embodiment.

In some embodiments, as depicted in FIG. 1, a portable computing device 100 includes a processor 101, a memory 102, communication circuitry 103, a digital-to-analog convertor (DAC) 104, an analog-to-digital convertor (ADC) 105, a display 106, an input unit 107, a loudspeaker 108, a microphone 109, a GPS module 110, and an identification (ID) memory 112. The portable computing device 100 may be a smart phone, a cell phone, a tablet computer, a laptop computer, or one of other computing devices designed or adopted for portability. The portable computing device 100 may be also referred to as a handheld computing device or a mobile computing device.

The processor 101 is a processing unit operative to execute computer programs resident on the memory 102 to process various data and to control the components 102 to 112 coupled to the processor 101. The processor 101 may be a central processing unit (CPU), a micro processing unit (MPU), a digital signal processor (DSP), another general or dedicated processing unit, or combination thereof.

The memory 102 is coupled to the processor 101 and is operative to store one or more computer programs and/or various data for execution and/or use by the processor 101. The memory 102 may be a read only memory (ROM), a random access memory (RAM), another memorizing component or computer-readable medium, or combination thereof. In some embodiments, the memory 102 stores at least an application-program-setup program (APS program 108) executable by the processor 101 comprising instructions for performing setup of App01.exe, such as instructions for the after-mentioned processes S10 to S12 and S20 to S23. The APS program 108 may be entirely or partly an application program which runs on an operating system (OS) or may be part of the OS. In some embodiments, the memory 102 also stores the identification (ID) 111 that uniquely identifies the portable computing device 100 on a wireless close-range communication network 10 or 20. An example of the ID 111 includes the MAC address, IP address, Bluetooth Device (BD) address, and Unique Identifier (UID), and unique name assigned to the portable computing device 100.

The ID memory 112 is coupled to the processor 101 and is operative to store ID information 113 indicative of the identity of the portable computing device 100 or the identity of user (i.e., owner) of the portable computing device 100, separated and independently from the ID 111. The ID memory 112 may be a memorizing component or computer-readable medium such as a ROM and RAM, separated from the memory 102, integrated with the memory 102, or being part of the memory 102. The ID memory 112 may be a Universal Integrated Circuit Card (UICC) or Subscriber Identification Module (SIM) card containing ID information that provides identification on a cellular network. In some embodiments, the ID 113 may be the International Mobile Subscriber Identity (IMSI) used to identify and authenticate the portable computing device 100 as the subscriber on a cellular network; Integrated Circuit Card Identifier (ICCID) used to identify the SIM card; International Mobile Equipment Identity (IMEI) used to identify the portable computing device 100 itself; Mobile Subscriber Integrated Services Digital Network Number (MSISDN) or simply phone number used to identify the portable computing device 100 as the subscriber on a cellular network; or the like; and/or a combination thereof. In some embodiments, the ID 113 may include information indicative of a user account, which is a private access right of the user or owner of the portable computing device 100 to an online computer system, provided by a particular online service provider such as Google Inc. An example of such account may include Google account provided by Google Inc., Facebook account provided by Facebook Inc., Yahoo account provided by Yahoo Inc.

The communication circuitry 103 is coupled to the processor 101 and is operative to perform close-range wireless communication in accordance to at least one close-range wireless communication standard. The communication circuitry 103 may be a single circuit designed to perform a close-range wireless communication in compliance with a single communication standard, or may be one or more single or combined circuits designed to perform close-range wireless communication in compliance with multiple communication standards. The close-range wireless communication herein may include a WLAN or Wi-Fi communication in accordance with any one of IEEE 802.11 standards, and a WPAN communication such as the Bluetooth and ZigBee in accordance with any one of IEEE 802.15 standards, a RFID communication, a NFC, an ultrasonic communication, an IR communication, and the likes. In some embodiments, the communication circuitry 103 may also include a circuit designed to perform a cellular communication over a cellular network. The cellular network may be a 3G, 4G, or 5G network, for example.

The DAC 104 is coupled to the processor 101 and the loudspeaker 108. The DAC 104 is operative to convert digital audio data processed by the processor 101 into analog audio signals and then feed the analog audio signals to the loudspeaker 108. The loudspeaker 108 is operative to output the analog audio signals received from the DAC 104, as sound.

The microphone 109 is operative to pick up sound and feed analog audio signals of the sound to the ADC 105. The ADC 105 is coupled to the microphone 109 and the processor 101. The ADC 105 is operative to convert the analog audio signals received from the microphone 109 into digital audio data and feed the digital audio data to the processor 101.

The display 106 is coupled to the processor 101. The display 106 is operative to receive, from the processor 101, graphical data processed by the processor 101 to display graphical screen based on the graphical data. The display 106 may be a liquid crystal display (LCD), an electroluminance (EL) display, or another similar type of display device.

The input 107 is coupled to the processor 101. The input 107 is operative to receive a user input made on the input 107 and feed signals indicative of the user input to the processor 101. The input 107 may be a keyboard or keypad with a plurality of mechanical keys. The input 107 may be a touch sensitive device integrated with the display 106, in which case the display 106 and the input 107 together constitute a touch sensitive display operative to detect touches or taps made by a user onto the surface of the touch sensitive display and feed signals indicative of the touches or taps to the processor 101.

The GPS module 110 is circuitry operative to receive position information indicative of a geographical position in which the portable computing device 100 is present, based on the global positioning system (GPS).

Figure 2:
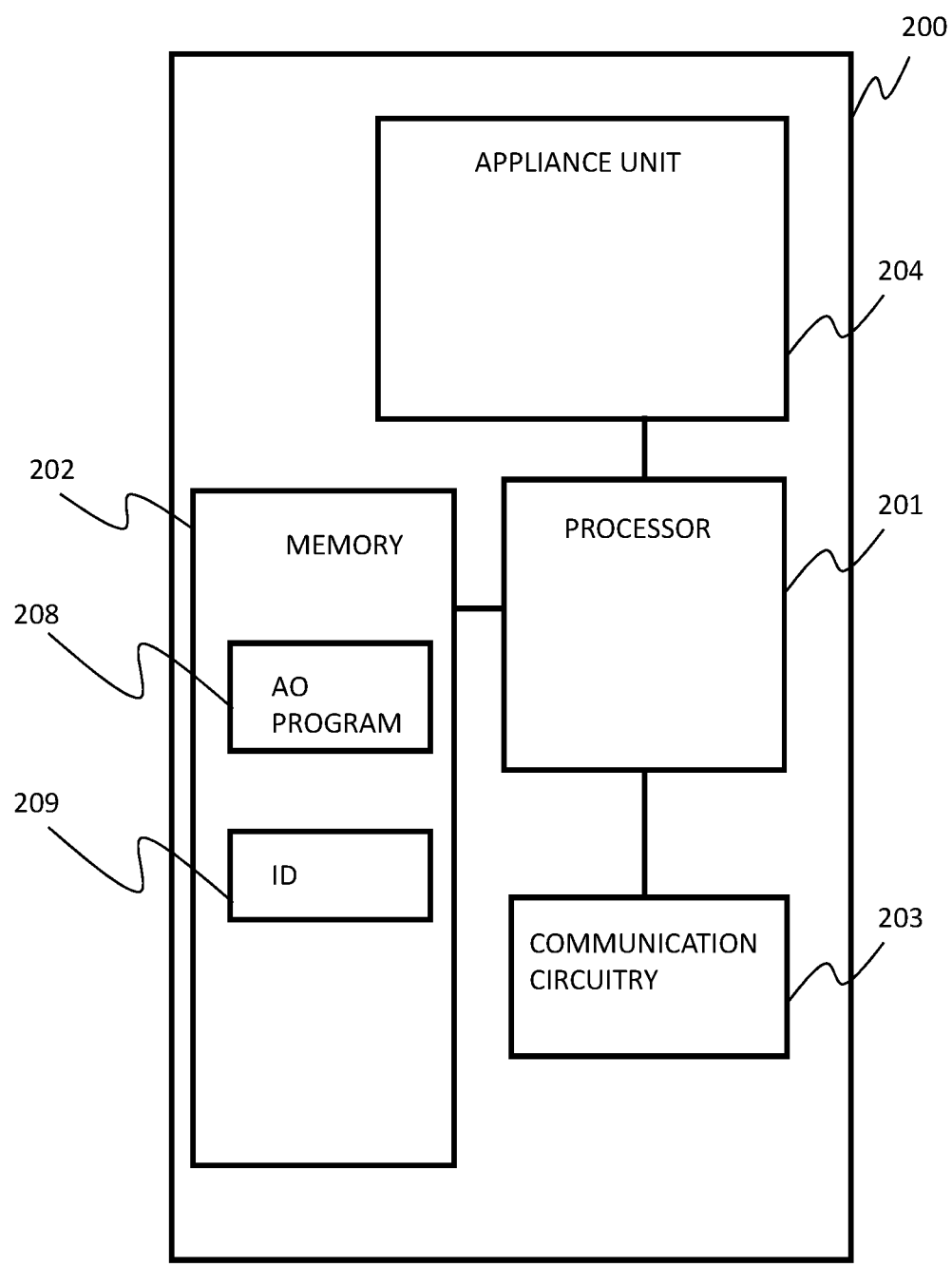
FIG. 2 is a block diagram illustrating hardware components and/or circuitry provided in an appliance 200 according to an embodiment.

In some embodiments, as depicted in FIG. 2, an appliance 200 includes a processor 201, a memory 202, communication circuitry 203, and an appliance unit 204. The appliance 200 is an appliance designed to perform at least one specific function which is realized by the appliance unit 204. The appliance 200 is encased by a housing or body physically separated and independent from the portable computing device 100. In detail, the appliance may be a home, personal, professional, wearable, industrial, or military appliance, device, apparatus, gadget, instrument, equipment, or the like for use in home, offices, factories, buildings, on the street, or other locations. The home appliance may be a television set, a video recorder, a telephone set, a radio-cassette player, a boom-box, an amplifier, a CD/DVD/BD player, a personal computer, a radio tuner, an iron, an electric shaver, an electric toothbrush, a vacuum cleaner, a washing machine, a bidet, a refrigerator, a freezer, a kitchen oven, a microwave oven, a dish washer, a food processor, an air conditioner, a humidifier, an electric fan, a lighting device, a lamp, a wired or wireless microphone set, a power amplifier, a surveillance camera, a vending machine, an automated teller machine, a bakery machine, measurement equipment, a parking meter, a workstation, a cash register, a sensor, a robot, an automobile, a truck, a motorcycle, an industrial vehicle, a security system, a lawn mower, and so on.

The appliance unit 204 is a combination of one or more components designed and assembled to accomplish one or more functionalities dedicated to the appliance 200.

The processor 201 is a processing unit operative to execute computer programs resident on the memory 202 to process various data and to control the components coupled to the processor 201. The processor 201 may be a central processing unit (CPU), a micro processing unit (MPU), a digital signal processor (DSP), another general or dedicated processing unit, or combination thereof.

The memory 202 is coupled to the processor 201 and is operative to store one or more computer programs and/or various data for execution and/or use by the processor 201. The memory 202 may be a read only memory (ROM), a random access memory (RAM), another memorizing component or computer-readable medium, or combination thereof. In some embodiments, the memory 202 stores an appliance operation program (AO program 208) executable by the processor 201 comprising instructions for performing monitor and/or control of the appliance unit 204 in communication with App01.exe and instructions for performing setup of App01.exe such as instructions for the after-mentioned processes S10 to S11 and S20 to S22. The AO program 208 may be entirely or partly an application program which runs on an operating system (OS) or may be part of the OS. In some embodiments, the memory 202 also stores the identification (ID) 209 that uniquely identifies the appliance 200 on the wireless close-range communication network 10 or 20. An example of the ID 209 includes the MAC address, IP address, Bluetooth Device (BD) address, and Unique Identifier (UID), and unique name assigned to the appliance 200.

The communication circuitry 203 is coupled to the processor 201 and is operative to perform wireless communication in accordance with at least one close-range wireless communication standard. The communication circuitry 203 may be a single circuit designed to perform a close-range wireless communication in compliance with a single communication standard, or may be a combination of multiple circuits designed to perform close-range wireless communication in compliance with multiple communication standards. The close-range wireless communication herein may include a WLAN or Wi-Fi communication in accordance with any one of IEEE 802.11 standards, and a WPAN communication such as the Bluetooth and ZigBee in accordance with any one of IEEE 802.15 standards, a RFID communication, a NFC, a ultrasonic communication, an IR communication, and the likes. The communication circuitry 203 may also include a circuit designed to perform wired communication in accordance with at least one wired communication standard using a physical cable for an Internet communication. The wired communication may be a local area network (LAN) communication pursuant to, for example, IEEE 802.3 specifications. The communication circuitry 203 may also include a circuit designed to perform a cellular communication over a cellular network. The cellular network may be a 3G, 4G, or 5G network, for example.

Figure 3:
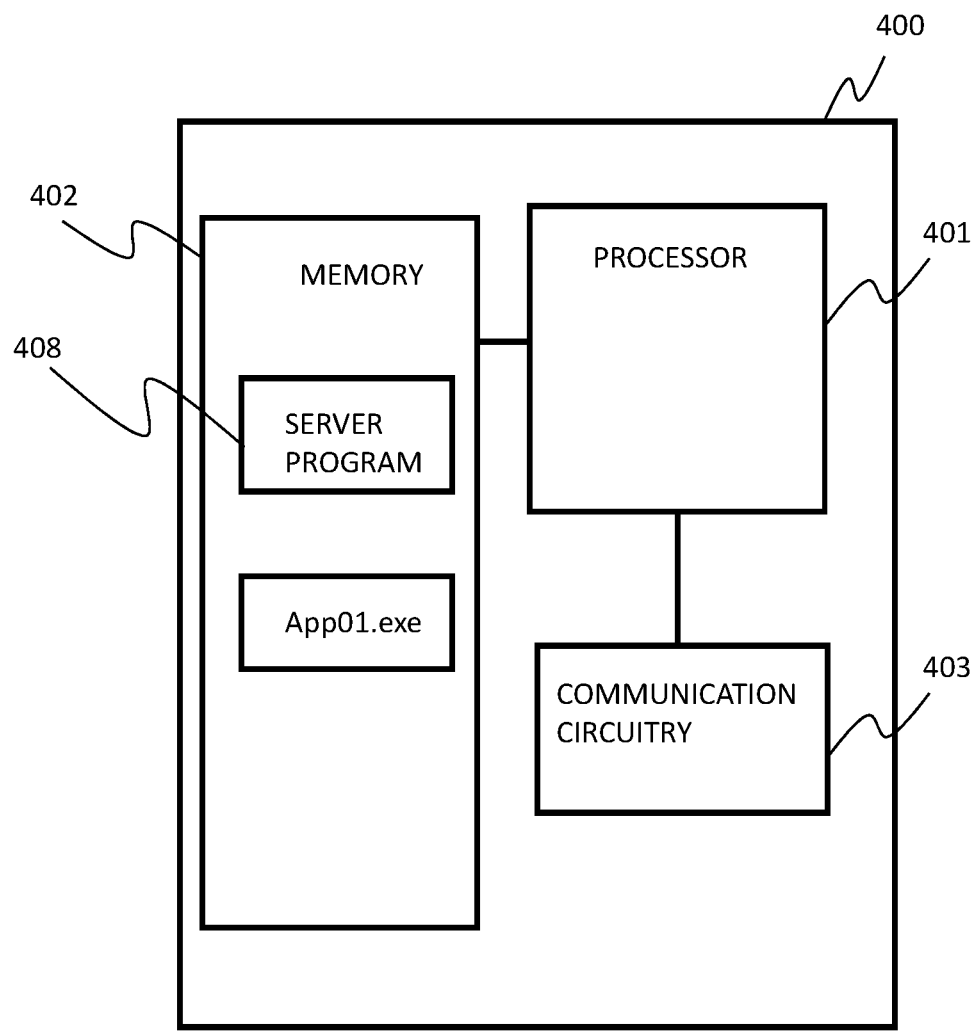
FIG. 3 is a block diagram illustrating hardware components and/or circuitry provided in a server computer 400 according to an embodiment.

In some embodiments, as depicted in FIG. 3, a server computer 400 includes a processor 401, a memory 402, and communication circuitry 403. The server computer 400 is a computer system that stores App01.exe. The server computer 400 is configured to be accessible by the portable computing device 100 and/or the appliance 200 over the Internet.

The processor 401 is a processing unit operative to execute computer programs resident on the memory 402 to process various data and to control the components coupled to the processor 401. The processor 401 may be a central processing unit (CPU), a micro processing unit (MPU), a digital signal processor (DSP), another general or dedicated processing unit, or combination thereof.

The memory 402 is coupled to the processor 401 and is operative to store one or more computer programs and/or various data for execution and/or use by the processor 401. The memory 402 may be a read only memory (ROM), a random access memory (RAM), another memorizing component or computer-readable medium, or combination thereof. In some embodiments, the memory 402 stores a server program 408 executable by the processor 401 comprising instructions for performing setup of the App01.exe, such as instructions for the after-mentioned processes S10 to S11 and S20 to S22. The server program 408 may be entirely or partly an application program which runs on an operating system (OS) or may be part of the OS. The memory 402 also stores App01.exe. The App01.exe includes computer program instructions for exchange of data and/or commands with the AO program 208 over the close-range wireless communication network 10 or 20, allowing for user experiences such as display of the status of the appliance 200 on the portable computing device 100 and control of the appliance 200 by way of commands generated by the portable computing device 100.

The communication circuitry 403 is coupled to the processor 401 and is operative to perform wired communication in accordance with at least one wired communication standard using a physical cable for an Internet communication. The wired communication may be a local area network (LAN) communication pursuant to, for example, IEEE 802.3 specifications.

Network

Figure 4:
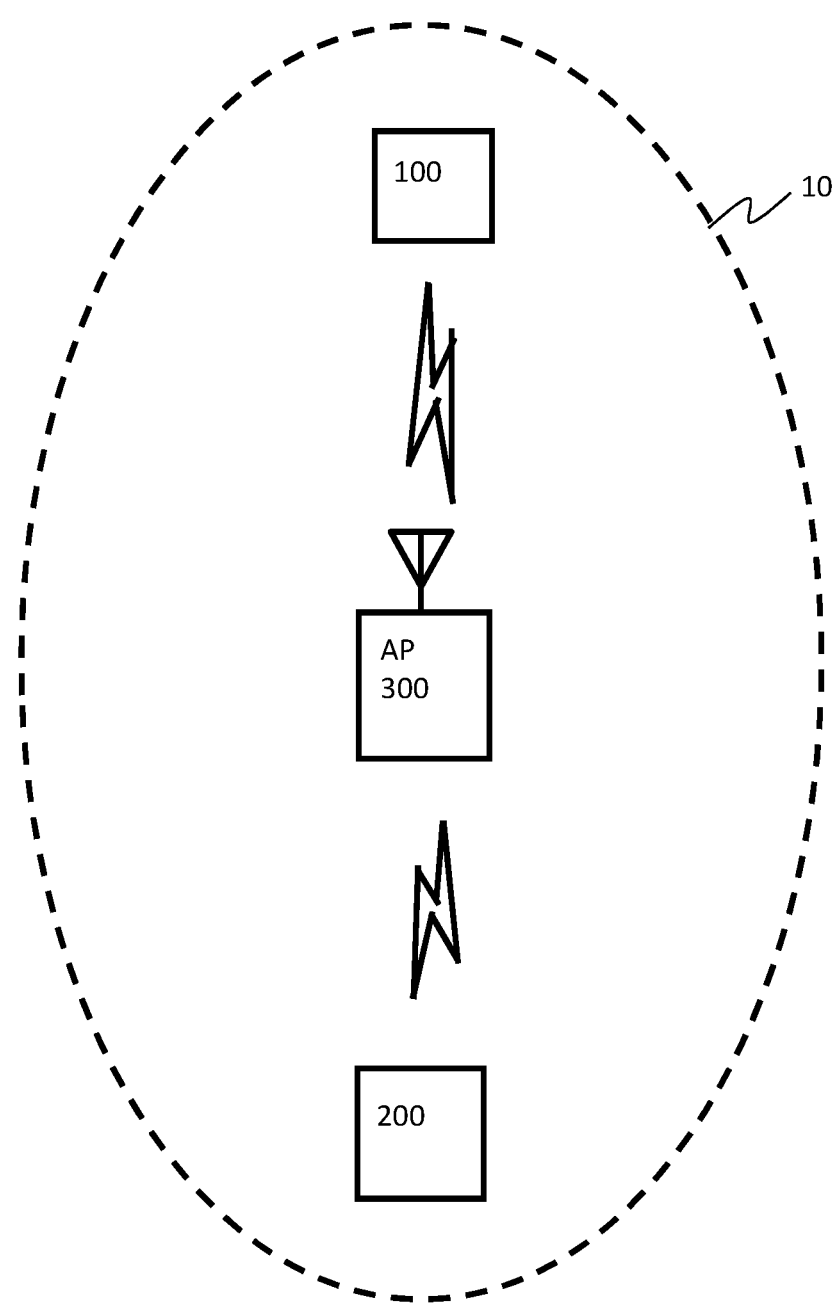
FIG. 4 illustrates a close-range wireless communication network 10, such as a wireless local area network (WLAN) or Wi-Fi network, provided via an access point (AP) 300.

In some embodiments, the portable computing device 100 and the appliance 200 can be connected with each other indirectly via an access point (AP) 300, as depicted in FIG. 4. In the embodiments, the AP 300, which is separated from the portable computing device 100 and the appliance 200, operates to provide a close-range wireless communication network 10, while each of the portable computing device 100 and the appliance 200 operates as a client. Within the range of the close-range wireless communication network 10, the portable computing device 100 and the appliance 200 are able to wirelessly communicate with each other via the AP 300. Such communication via the AP 300 may be achieved by WLAN or Wi-Fi communication in the infrastructure mode pursuant to IEEE 802.11, for example.

Figure 5:
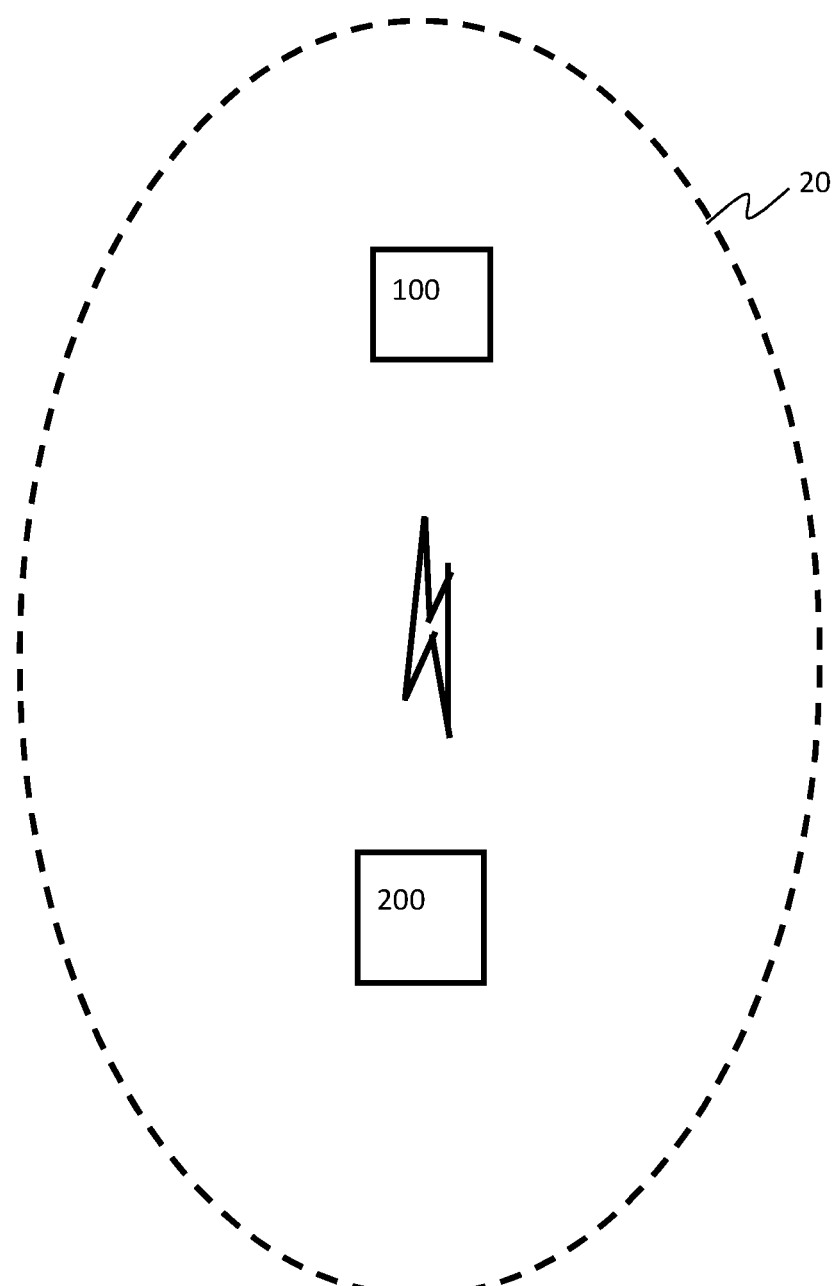
FIG. 5 illustrates a close-range wireless communication network 20, such as a WLAN or wireless personal area network (WPAN), provided in a peer-to-peer (P2P) manner.

In some embodiments, the portable computing device 100 and the appliance 200 can be connected with each other directly in a peer-to-peer (P2P) manner, as depicted in FIG. 5. In the embodiments, one of the portable computing device 100 and the appliance 200 may operate as a master to provide a close-range wireless communication network 20 while the other may operate as a slave. Within the range of the close-range wireless communication network 20, the portable computing device 100 and the appliance 200 are able to wirelessly communicate with each other directly in the P2P manner. Such direct or device-to-device communication may be achieved, for example, by WLAN or Wi-Fi communication in the AdHoc mode pursuant to IEEE 802.11, Wi-Fi Direct communication, or WPAN communication such as the Bluetooth and ZigBee pursuant to IEEE 802.15, RFID communication, NFC, ultrasonic communication, and IR communication.

In some embodiments, the portable computing device 100 is able to connect to the Internet 40, outside the wireless close-range communication network 10 or 20, thorough the communication circuitry 103 as depicted in FIG. 6. The Internet connection may be made by way of the AP 300 connected to the Internet, or may be made by way of a cellular network 50 with multiple bases stations (BS) and cells provided by the BS, such as a 3G network pursuant to IMT-2000, 4G network, LTE network, 5G network, and the likes. The server computer 400 storing App01.exe may be connected to the Internet 40 over which the portable computing device 100 and/or the appliance 200 accesses to the server computer 400.

Operation

In some embodiments, the portable computing device 100 performs an automatic application program setup (S11) upon discovering the appliance 200 in the close-range wireless communication network (S10), as depicted in FIG. 7A. As a result of the automatic application program setup, App01.exe is set up and made accessible by a user. After the automatic application program setup, the portable computing device 100 monitors communication to determine whether or not App01.exe should be kept accessible by a user (S12).

In some embodiments, as depicted in FIG. 7B, the portable computing device 100 performs authentication to determine whether or not the portable computing device 100 is authorized to perform the automatic application program setup (S21) prior to the automatic application program setup (S22), upon discovering the appliance 200 in the close-range wireless communication network (S20). The automatic application program setup (S22) is not performed unless the determination is positive at the authentication (S21). As a result of the automatic application program setup, App01.exe is set up and made accessible by a user. After the automatic application program setup, the portable computing device 100 monitors communication to determine whether or not App01.exe should be kept accessible by a user (S23).

Discovery Process: S10, S20

In some embodiments, the portable computing device 100 may automatically discover the appliance 200 by use of at least one of known service discovery processes, so as to know the presence and identifier of the appliance 200. The known service discovery processes may include a Web Service Dynamic Discovery (WSD) approved by Organization for the Advancement of Structured Information Standards (OASIS), Domain Name System (DNS)-based Service Discovery (DNS-SD) such as multicast DNS (mDNS) published as RFC 6762, Simple Service Discovery Protocol (SSDP) used in Universal Plug And Play (UPnP), Service Discovery Protocol (SDP) used in Bluetooth, and the likes. Typically, as depicted in FIG. 8, the discovery process may be achieved by way of announcement, advertisement, or notification of the presence by the portable computing device 100 and/or the appliance 200 using a multicast message (S100, S200), search for devices of interest by the portable computing device 100 and/or the appliance 200 using a multicast message (S101, S201), and response to the search by the portable computing device 100 and/or the appliance 200 using a unicast message (S102, S202). The discovery process may enable the portable computing device 100 and the appliance 200 to know the presence of one another and exchange the identifications (i.e., ID 209 and ID 111), such as MAC addresses, IP addresses, Bluetooth Device (BD) addresses, and Unique Identifiers (UID), and uniquely assigned names, for identification of them on the wireless communication network 10 or 20. The discovery process may finish by the portable computing device 100 and/or the appliance 200 storing the exchanged IDs on the memory 102 and/or the memory 202, respectively (S103, S203). The discovery process at the step S10 or S20 may be achieved by way of the steps S100 through S103 and steps S200 through S203. The portable computing device 100 may perform the steps S100 through S103 by the processor 101 executing the instructions of the APS program 108 resident on the memory 102, wherein the instructions may at least partly include: announcing the presence of the portable computing device 100 along with the ID 111 in the memory 102 of the portable computing device 100 using a multicast message (S100); searching other devices of interest present within the range of the wireless communication network 10 or 20 using a multicast message (S101); responding to a multicast message for search from the appliance 200 using a unicast message (S102); and storing the ID 209 on the memory 102. The appliance 200 may perform the steps S200 through S203 by the processor 101 executing the instructions of the AO program 208 resident on the memory 202, wherein the instructions may at least partly include: announcing the presence of the appliance 200 along with the ID 209 in the memory 202 of the appliance 200 using a multicast message (S200); searching other devices of interest present within the range of the wireless communication network 10 or 20 using a multicast message (S201); responding to a multicast message for search from the portable computing device 100 using a unicast message (S202); and storing the ID 111 on the memory 202.

In some embodiments, prior to storing the ID 209 on the memory 102 (S103), the portable computing device 100 notifies a user of the discovery of the appliance 200, allowing the user to select the appliance 200 (S110), as depicted in FIG. 9. The notification may be made, for example, by popping up a dialog 50 on a graphical user interface (GUI) on the display 106, as depicted in FIG. 10. In response to receiving a user input made through the input unit 107 for selection of the appliance 200 (S111: Yes), the portable computing device 100 stores the ID 209 on the memory 102 (S103). The portable computing device 100 may perform the steps S110 and S111 by the processor 101 executing the instructions of the APS program 108 resident on the memory 102, wherein the instructions may include: upon discovery of the appliance 200, notifying a user of the discovery of the appliance 200, allowing the user to select the appliance 200 (S110); and receiving a user input of selecting the appliance 200 through the input unit 107 (S111: Yes).

The techniques for the service discovery process, for example, through the above-mentioned WSD, DNS-SD, SSDP, SDP, etc. are known to those skilled in the art and disclosed, for example, in the following U.S. patent publications, the contents of which are incorporated herein by reference in their entireties:

U.S. patent application publication No. 2015/0373505 filed on Jun. 16, 2015
U.S. issued Pat. No. 8,559,350 filed on May 15, 2006
U.S. issued Pat. No. 9,591,674 filed on May 3, 2013
U.S. issued Pat. No. 8,635,341 filed on Feb. 14, 2008
U.S. patent application publication No. 2014/0214958 filed on Jan. 16, 2014
U.S. issued Pat. No. 9,326,301 filed on Mar. 6, 2014
U.S. patent application publication No. 2014/0366105 filed on May 28, 2014
U.S. issued Pat. No. 8,665,744 filed on May 18, 2014
U.S. patent application No. 2016/0219014 filed on Feb. 24, 2014
U.S. issued Pat. No. 8,625,418 filed on Nov. 24, 2006
U.S. issued Pat. No. 7,333,464 filed on Feb. 21, 2006

App01.exe and App info in Memory 202

In some embodiments, referring to FIG. 11, the appliance 200 preliminarily stores App01.exe along with the ID 209 and the AO program 208, on the memory 202.

In some embodiments, referring to FIG. 12, the memory 202 of the appliance 200 stores application information (App info) 211 along with the ID 209, the AO program 208, and the App01.exe. The App info 211 is information related to App01.exe, such as the name, version, and size of the App01.exe, which may be metadata associated with App01.exe in other words.

In some embodiments where App01.exe is resident on and available from the server computer 400, referring to FIG. 13, the memory 202 stores application information (App info) 211 without storing App01.exe. The App info 211 is information related to App01.exe, such as the name, version, size, and uniform resource identifier (URI) that points to App01.exe resident on the server computer 400. The URI may information indicative of the location of App01.exe on the server computer 400, such as a uniform resource locator (URL).The App info 211 may be metadata associated with App01.exe in other words.

Authentication: S21

In some embodiments, the portable computing device 100 performs authentication to determine whether or not the portable computing device 100 is authorized to download App01.exe from the appliance 200 or the server computer 400 for setup of App01.exe on the portable computing device 100, upon completion of the discovery process (S21).

In some embodiments, for the authentication process, the appliance 200 stores on the memory 202 an authentication database 213 along with others (i.e., AO program 208, ID 209, App01.exe, App info 211, and/or App info 212), as depicted in FIG. 14. The authentication database 213 may list one or more positive IDs, indicating that a user or a device with one of the positive IDs assigned thereto is authorized to set up or use App01.exe whereas a user or device without any one of the positive IDs assigned thereto is not authorized to do so. A form of each ID of the positive IDs may correspond to that of ID 113 stored in the portable computing device 100, namely: IMSI identifying a subscriber on a cellular network; ICCID identifying SIM card;

IMEI identifying a device itself; MSISDN or simply phone number of a device as a subscriber on a cellular network; a user account provided by a particular online service provider such as Google account provided by Google Inc., Facebook account provided by Facebook Inc., and Yahoo account provided by Yahoo Inc.; or the like; and/or a combination thereof. In the embodiments, the authentication is achieved by comparing the ID 113 stored in the portable computing device 100 with the positive IDs in the authentication database 213.

Referring to FIG. 15, the portable computing device 100 performs a close-range wireless communication with the appliance 200 over the close-range wireless communication network 10 or 20 to send the ID 113 in the ID memory 112 to the appliance 200, by addressing the ID 113 to the ID 209 stored at S103 (S120). In response to reception of the ID 113, the appliance 200 compares the ID 113 with the positive IDs with reference to the authentication database 213 to determine whether or not the ID 113 is included in the positive IDs (S220). The appliance 200 performs a close-range wireless communication with the portable computing device 100 over the close-range wireless communication network 10 or 20 to send a positive reply to the portable computing device 100 if the ID 113 is determined to be included in the positive IDs, whereas the appliance 200 performs a close-range wireless communication with the portable computing device 100 over the close-range wireless communication network 10 or 20 to send a negative reply to the portable computing device 100 if the ID 113 is determined to be not included in any one of the positive IDs (S221). The positive reply indicates that the portable computing device 100 is authorized to set up and use App01.exe, whereas the negative reply indicates that the portable computing device 100 is not authorized to do so. In response to reception of the reply, the portable computing device 100 proceeds to Automatic Application Program Setup (S22) in case of the positive reply (S121: Yes). If the portable computing device 100 receives the negative reply (S121: No), the portable computing device 100 notifies a user of the fact that the user cannot communicate with the appliance 200 by the portable computing device 100 using App01.exe (S122). The notification at S122 may be achieved by, for example, displaying or popping up a dialog 51 that shows the disability on the display 106, as depicted in FIG. 16. The authentication process at the step S21 may be achieved by way of the steps S120 through S122 and steps S220 through S221. The portable computing device 100 may perform the steps S120 through S122 by the processor 101 executing the instructions of the APS program 108 resident on the memory 102, wherein the instructions may at least partly correspond to S120 through S122. The appliance 200 may perform the steps S220 through S221 by the processor 201 executing the instructions of the AO program 208 resident on the memory 202, wherein the instructions may at least partly correspond to S220 through S221.

In some embodiments, for the authentication process, the application server computer 400 stores an authentication database 413 along with App01.exe, as depicted in FIG. 17. The authentication database 413 may list one or more positive IDs, indicating that a user or a device with one of the positive IDs assigned thereto is authorized to set up or use App01.exe whereas a user or device without any one of the positive IDs assigned thereto is not authorized to do so. A form of each ID of the positive IDs may correspond to that of ID 113 stored in the portable computing device 100, namely: IMSI identifying a subscriber on a cellular network; ICCID identifying SIM card; IMEI identifying a device itself; MSISDN or simply phone number of a device as a subscriber on a cellular network; a user account provided by a particular online service provider such as Google account provided by Google Inc., Facebook account provided by Facebook Inc., and Yahoo account provided by Yahoo Inc.; or the like; and/or a combination thereof. In the embodiments, the authentication is achieved by comparing the ID 113 stored in the portable computing device 100 with the positive IDs in the authentication database 413.

Referring to FIG. 18, the portable computing device 100 performs a close-range wireless communication with the appliance 200 over the close-range wireless communication network 10 or 20 to send a request for App info 211 to the appliance 200, by addressing the request to the ID 209 stored at S103 (S130). In response to reception of the request, the appliance 200 performs a close-range wireless communication with the portable computing device 100 over the close-range wireless communication network 10 or 20 to send App info 211 in the memory 202 to the portable computing device 100 (S230). In response to reception of the App info 211, the portable computing device 100 performs an Internet communication with the application server computer 400 over the Internet to send the ID 113 in the ID memory 112 to the application server computer 400, by addressing the ID 113 to the URI contained in App info 211 (S131). In response to reception of the ID 113, the application server computer 400 compares the ID 113 with the positive IDs with reference to the authentication database 413 to determine whether or not the ID 113 is included in the positive IDs (S430). The application server computer 400 performs an Internet communication with the portable computing device 100 over the Internet to send a positive reply to the portable computing device 100 if the ID 113 is determined to be included in the positive IDs, whereas the application server computer 400 performs an Internet communication with the portable computing device 100 over the Internet to send a negative reply to the portable computing device 100 if the ID 113 is determined to be not included in any one of the positive IDs (S431). The positive reply indicates that the portable computing device 100 is authorized to set up and use App01.exe, whereas the negative reply indicates that the portable computing device 100 is not authorized to do so. In response to reception of the reply, the portable computing device 100 proceeds to Automatic Application Program Setup (S22) in case of the positive reply (S132: Yes). If the portable computing device 100 receives the negative reply (S132: No), the portable computing device 100 notifies a user of the fact that the user cannot communicate with the appliance 200 by the portable computing device 100 using App01.exe (S133). The notification at S133 may be achieved by, for example, displaying or popping up a dialog 51 that shows the disability on the display 106, as depicted in FIG. 16. The authentication process at the step S21 may be achieved by way of the steps S130 through S133, S230, and S430 through S431. The portable computing device 100 may perform the steps S130 through S133 by the processor 101 executing the instructions of the APS program 108 resident on the memory 102, wherein the instructions may at least partly correspond to S130 through S133. The appliance 200 may perform the step S230 by the processor 201 executing the instructions of the AO program 208 resident on the memory 202, wherein the instructions may at least partly correspond to S230. The server computer 400 may perform the step S430 through S431 by the processor 401 executing the instructions of the server program 408 resident on the memory 402, wherein the instructions may at least partly correspond to S430 through S431.

Referring to FIG. 19, the portable computing device 100 performs a close-range wireless communication with the appliance 200 over the close-range wireless communication network 10 or 20 to send a request for authentication with the ID 113 to the appliance 200, by addressing the request to the ID 209 stored at S103 (S140). In response to reception of the request, the appliance 200 performs an Internet communication with the server computer 400 over the Internet 40 to send a request for authentication with the ID 113 to the server computer 400, by addressing the request to the URI contained in App info 211 (S240). In response to reception of the request, the server computer 400 compares the received ID 113 with the positive IDs with reference to the authentication database 413 to determine whether or not the ID 113 is included in the positive IDs (S440). The application server computer 400 performs an Internet communication with the appliance 200 over the Internet to send a positive reply to the appliance 200 if the ID 113 is determined to be included in the positive IDs, whereas the application server computer 400 performs an Internet communication with the appliance 200 over the Internet to send a negative reply to the appliance 200 if the ID 113 is determined to be not included in any one of the positive IDs (S441). The positive reply indicates that the portable computing device 100 is authorized to set up and use App01.exe, whereas the negative reply indicates that the portable computing device 100 is not authorized to do so. In response to reception of the reply, the appliance 200 performs a close-range wireless communication with the portable computing device 100 over the close-range wireless communication network 10 or 20 to forward the positive or negative reply to the portable computing device 100, by addressing the reply to the ID 111 stored at S203 (S241). In response to reception of the positive or negative reply, the portable computing device 100 proceeds to Automatic Application Program Setup (S22) in case of the positive reply (S142: Yes). If the portable computing device 100 receives the negative reply (S142: No), the portable computing device 100 notifies a user of the fact that the user cannot communicate with the appliance 200 by the portable computing device 100 using App01.exe (S143). The notification at S143 may be achieved by, for example, displaying or popping up a dialog 51 that shows the disability on the display 106, as depicted in FIG. 16. The authentication process at the step S21 may be achieved by way of the steps S140 through S143, S240 through S241, and S440 through S441. The portable computing device 100 may perform the steps S140 through S143 by the processor 101 executing the instructions of the APS program 108 resident on the memory 102, wherein the instructions may at least partly correspond to S140 through S143. The appliance 200 may perform the steps S240 through S241 by the processor 201 executing the instructions of the AO program 208 resident on the memory 202, wherein the instructions may at least partly correspond to S240 through S241. The server computer 400 may perform the steps S440 through S441 by the processor 401 executing the instructions of the server program 408 resident on the memory 402, wherein the instructions may at least partly correspond to S440 through S441.

Autonomous Application Program Setup: S11, S22

In some embodiments, the portable computing device 100 automatically or autonomously fetches App01.exe resident on the memory 202 of the appliance 200 to set up the App01.exe on the portable computing device 100. In the embodiments, as depicted in FIG. 20, the portable computing device 100 performs a close-range wireless communication with the appliance 200 over the close-range wireless communication network 10 or 20 to send to the appliance 200 a request for download of the App01.exe, by addressing the request to the ID 209 (S1000). In response to the request, the appliance 200 acknowledges the request for download and streams App01.exe to the portable computing device 100 over the close-range wireless communication network 10 or 20 (S2000), so that the portable computing device 100 downloads the App01.exe from the appliance 200 over the close-range wireless communication network 10 or 20 (S1001). The portable computing device 100 stores and installs the downloaded App01.exe on the memory 102 (S1002). App01.exe may be stored in association with the ID 209 (ID of the appliance 200) as depicted in FIG. 26A, so as for the portable computing device 100 to manage App01.exe in association with the appliance 200. Upon completion of the installation of the App01.exe, the portable computing device 100 enables a user interface for launch of and access to the App01.exe (S1003). The automatic program setup process at the step S11 or S22 may be achieved by way of the steps S1000 through S1003 and S2000. The portable computing device 100 may automatically perform the steps S1000 through S1003 by the processor 101 executing the instructions of the APS program 108 resident on the memory 102, wherein the instructions may include: performing a close-range wireless communication with the appliance 200 over the close-range wireless communication network 10 or 20 to send to the appliance 200 a request for download of the App01.exe (S1000); downloading the App01.exe from the appliance 200 over the close-range wireless communication network 10 or 20 (S1001); storing and installing the downloaded App01.exe on the memory 102 (S1002); and, in response to completion of the installation of the App01.exe, enabling a user interface for launch of and access to the App01.exe (S1003). The appliance 200 may automatically perform the step S2000 by the processor 201 executing the instructions of the AO program 208 resident on the memory 202, wherein the instructions may include acknowledging the request for download of App01.exe and streaming App01.exe to the portable computing device 100 over the close-range wireless communication network 10 or 20 (S2000).

In some embodiments, the portable computing device 100 automatically or autonomously fetches the App01.exe from the appliance 200 on a condition that the App01.exe is not available locally on the portable computing device 100. In the embodiments, as depicted in FIG. 21, the portable computing device 100 first determines whether or not the App01.exe is stored on the memory 102 (S1100). The determination at the step S1100 may be made, for example, by determining whether or not there is stored an application program associated with the ID 209 on the memory 102. If yes, the associated application program is App01.exe that was once ever downloaded and installed on the portable computing device 100 and remains on the memory 102. On the other hand, the determination at S1100 should be negative if App01.exe has never been installed on the memory 102 in the past or has been deleted off the memory 102 although once installed. Upon determining affirmatively at S1100 (S1100: Yes), the portable computing device 100 enables a user interface for launch of and access to App01.exe (S1104). Upon determining negatively at S1100 (S1100: No), the portable computing device 100 performs a close-range wireless communication with the appliance 200 over the close-range wireless communication network 10 or 20 to send to the appliance 200 a request for download of the App01.exe, by addressing the request to the ID 209 (S1101). In response to the request, the appliance 200 acknowledges the request for download and streams App01.exe to the portable computing device 100 over the close-range wireless communication network 10 or 20 (S2100), so that the portable computing device 100 downloads the App01.exe from the appliance 200 over the close-range wireless communication network 10 or 20 (S1102). The portable computing device 100 stores and installs the downloaded App01.exe on the memory 102 (S1103). App01.exe may be stored in association with the ID 209 (ID of the appliance 200) as depicted in FIG. 26A, so as for the portable computing device 100 to manage App01.exe in association with the appliance 200. Upon completion of the installation of the App01.exe, the portable computing device 100 enables a user interface for launch of and access to the App01.exe (S1104). The automatic program setup process at the step S11 or S22 may be achieved by way of the steps S1100 through S1104 and S2100. The portable computing device 100 may automatically perform the steps S1100 through S1104 by the processor 101 executing the instructions of the APS program 108 resident on the memory 102, wherein the instructions may include: determining whether or not App01.exe is stored on the memory 102 (S1100); upon determining negatively at S1100 (S1100: No), performing a close-range wireless communication with the appliance 200 over the close-range wireless communication network 10 or 20 to send to the appliance 200 a request for download of the App01.exe (S1101); downloading the App01.exe from the appliance 200 over the close-range wireless communication network 10 or 20 (S1102); storing and installing the downloaded App01.exe on the memory 102 (S1103); and enabling a user interface for launch of and access to the App01.exe, upon determining positively at S1100 (S1100: Yes) or upon completion of the installation of the App01.exe at S1103 (S1104). The appliance 200 may automatically perform the step S2100 by the processor 201 executing the instructions of the AO program 208 resident on the memory 202, wherein the instructions may include acknowledging the request for download of App01.exe and streaming App01.exe to the portable computing device 100 over the close-range wireless communication network 10 or 20 (S2100).

In some embodiments, the portable computing device 100 automatically or autonomously fetches the App01.exe from the appliance 200 on a condition that the App01.exe resident on the appliance 200 is not available locally on the portable computing device 100. In the embodiments, as depicted in FIG. 22, the portable computing device 100 performs a close-range wireless communication with the appliance 200 over the close-range wireless communication network 10 or 20 to send to the appliance 200 a request for the App Info 211, by addressing the request to the ID 209 (S1200). In response to reception of the request, the appliance 200 performs a close-range wireless communication with the portable computing device 100 over the close-range wireless communication network 10 or 20 to send to the portable computing device 100 the App info 211 resident on the memory 202, by addressing the App info 211 to the ID 111 (S2200), so that the portable computing device 100 receives the App Info 211 over the close-range wireless communication network 10 or 20 (S1201). The portable computing device 100 then determines, with reference to the App Info 211, whether or not App01.exe stored in the appliance 200 is also stored in the portable computing device 100 (S1202). More particularly, the determination at S1202 may be made by, for example, determining whether or not an application program identified by the App Info 211 is stored on the memory 102, or checking for an application program having the same metadata such as the name, size, and version as the App info 211 on the memory 102. App info 211 is the metadata of App01.exe resident on the memory 202 of the appliance 200, and therefore, if the determination at S1202 is affirmative, it means that the App01.exe with the same characteristics, properties, or qualities (e.g., name, size, and/or version) as the App01.exe resident in the appliance 200 is stored in the portable computing device 100, namely meaning that App01.exe stored in the appliance 200 is also stored in the portable computing device 100. If the determination at S1202 is negative, it means that the App01.exe stored in the appliance 200 is not stored in the portable computing device 100. The determination at S1202 should be negative if, for example, App01.exe had been once installed and remains on the memory 102, but App01.exe in the appliance 200 was updated to a higher version. Upon determining affirmatively at S1202 (S1202: Yes), the portable computing device 100 enables a user interface for launch of and access to the App01.exe (S1206). Upon determining negatively at S1202 (S1202: No), the portable computing device 100 performs a close-range wireless communication with the appliance 200 over the close-range wireless communication network 10 or 20 to send to the appliance 200 a request for download of the App01.exe, by addressing the request to the ID 209 (S1203). In response to the request, the appliance 200 acknowledges the request for download of App01.exe and streams App01.exe to the portable computing device 100 over the close-range wireless communication network 10 or 20 (S2201), so that the portable computing device 100 downloads the App01.exe from the appliance 200 over the close-range wireless communication network 10 or 20 (S1204). The portable computing device 100 then stores and installs the received App01.exe on the memory 102 (S1205). The App01.exe may be stored in association with the ID 209 of the appliance 200 and App Info 211, as depicted in FIG. 26B. Upon completion of the installation of the App01.exe, the portable computing device 100 enables a user interface for launch of and access to the App01.exe (S1206). The automatic program setup process at the step S11 or S22 may be achieved by way of the steps S1200 through S1206 and S2200 through S2201. The portable computing device 100 may automatically perform the steps S1200 through S1206 by the processor 101 executing the instructions of the APS program 108 resident on the memory 102, wherein the instructions may include: performing a close-range wireless communication with the appliance 200 over the close-range wireless communication network 10 or 20 to send to the appliance 200 a request for the App Info 211 (S1200); downloading the App Info 211 from the appliance 200 (S1201); determining, with reference to the App Info 211, whether or not the App01.exe identified by the App Info 211 is stored on the memory 102 (S1202); upon determining negatively at S1202 (S1202: No), performing a close-range wireless communication with the appliance 200 over the close-range wireless communication network 10 or 20 to send to the appliance 200 a request for download of the App01.exe (S1203); downloading the App01.exe from the appliance 200 over the close-range wireless communication network 10 or 20 (S1204); storing and installing the downloaded App01.exe on the memory 102 (S1205); and enabling a user interface for launch of and access to the App01.exe, upon determining positively at S1202 (S1202: Yes) or upon the installation of the App01.exe at S1205 (S1206). The appliance 200 may automatically perform the steps S2200 through S2201 by the processor 201 executing the instructions of the AO program 208 resident on the memory 202, wherein the instructions may include: sending App info 211 to the portable computing device 100 over the close-range wireless communication network 10 or 20 (S2200); and acknowledging the request for download and streaming App01.exe to the portable computing device 100 over the close-range wireless communication network 10 or 20 (S2201).

In some embodiments, the portable computing device 100 automatically or autonomously fetches the App01.exe from the server computer 400 over the Internet. In the embodiments, as depicted in FIG. 23, the portable computing device 100 performs a close-range wireless communication with the appliance 200 over the close-range wireless communication network 10 or 20 to send to the appliance 200 a request for the App Info 211, by addressing the request to the ID 209 (S1300). In response to reception of the request, the appliance 200 performs a close-range wireless communication with the portable computing device 100 over the close-range wireless communication network 10 or 20 to send to the portable computing device 100 the App info 211 resident on the memory 202, by addressing App info 211 to the ID 111 (S2300), so that the portable computing device 100 receives the App Info 211 over the close-range wireless communication network 10 or 20 (S1301). The portable computing device 100 knows the online location of App01.exe by referring to the URI associated with the App01.exe resident on the server computer 400, the URI being contained in the received App info 211, as depicted in FIG. 13. With reference to the URI, the portable computing device 100 performs an Internet communication with the server computer 400 to send to the server computer 400 a request for download of the App01.exe, by addressing the request to the URI (S1302). In response to the request, the server computer 400 acknowledges the request for download of App01.exe and streams App01.exe to the portable computing device 100 over the Internet 40 (S4300), so that the portable computing device 100 downloads the App01.exe from the server computer 400 over the Internet 40 (S1303). The portable computing device 100 then stores and installs the downloaded App01.exe on the memory 102 (S1304). The App01.exe may be stored in association with the ID 209 (ID of the appliance 200) as depicted in FIG. 26A, or may be stored in association with the ID 209 and App Info 211 as depicted in FIG. 26B. Upon completion of the installation of the App01.exe, the portable computing device 100 enables a user interface for launch of and access to the App01.exe (S1305). The steps S1300 through S1305 may be embodied by the instructions of the APS program 108 resident on the memory 102. The automatic program setup process at the step S11 or S22 may be achieved by way of the steps S1300 through S1305, S2300, and S4300. The portable computing device 100 may automatically perform the steps S1300 through S1305 by the processor 101 executing the instructions of the APS program 108 resident on the memory 102, wherein the instructions may include: performing a close-range wireless communication with the appliance 200 over the close-range wireless communication network 10 or 20 to send to the appliance 200 a request for the App Info 211 (S1300); receiving the App Info 211 from the appliance 200 (S1301); performing an Internet communication with the server computer 400 with reference to the URI contained the App Info 211 to send to the server computer 400 a request for download of the App01.exe (S1302); downloading the App01.exe from the server computer 400 over the Internet (S1303); storing and installing the downloaded App01.exe on the memory 102 (S1304); and enabling a user interface for launch of and access to the App01.exe (S1305). The appliance 200 may automatically perform the step S2300 by the processor 201 executing the instructions of the AO program 208 resident on the memory 202, wherein the instructions may include: sending App info 211 to the portable computing device 100 over the close-range wireless communication network 10 or 20 (S2300). The server computer 400 may automatically perform the step S4300 by the processor 401 executing the instructions of the server program 408 resident on the memory 402, wherein the instructions may include: acknowledging the request for download of App01.exe and streaming App01.exe to the portable computing device 100 over the Internet 40 (S4300).

In some embodiments, the portable computing device 100 automatically or autonomously fetches the App01.exe from the server computer 400 on a condition that the App01.exe is not available locally on the portable computing device 100. In the embodiments, as depicted in FIG. 24, the portable computing device 100 first determines whether or not the App01.exe is stored on the memory 102 (S1400). The determination at the step S1400 may be made, for example, by determining whether or not there is stored an application program associated with the ID 209 on the memory 102. If yes, the associated application program is App01.exe that was once ever downloaded and installed on the portable computing device 100 and remains on the memory 102. On the other hand, the determination at S1400 should be negative if App01.exe has never been installed on the memory 102 in the past or has been deleted off the memory 102 although once installed. Upon determining affirmatively at S1400 (S1400: Yes), the portable computing device 100 enables a user interface for launch of and access to App01.exe (S1406). Upon determining negatively at S1400 (S1400: No), the portable computing device 100 performs a close-range wireless communication with the appliance 200 over the close-range wireless communication network 10 or 20 to send to the appliance 200 a request for the App Info 211, by addressing the request to the ID 209 (S1401). In response to reception of the request, the appliance 200 performs a close-range wireless communication with the portable computing device 100 over the close-range wireless communication network 10 or 20 to send to the portable computing device 100 the App info 211 resident on the memory 202, by addressing App info 211 to the ID 111 (S2400), so that the portable computing device 100 receives the App Info 211 over the close-range wireless communication network 10 or 20 (S1402). The portable computing device 100 knows the online location of App01.exe by referring to the URI associated with the App01.exe resident on the server computer 400, the URI being contained in the received App info 211, as depicted in FIG. 13. With reference to the URI, the portable computing device 100 performs an Internet communication with the server computer 400 to send to the server computer 400 a request for download of the App01.exe, by addressing the request to the URI (S1403). In response to the request, the server computer 400 acknowledges the request for download of App01.exe and streams App01.exe to the portable computing device 100 over the Internet 40 (S4400), so that the portable computing device 100 downloads the App01.exe from the server computer 400 over the Internet 40 (S1404). The portable computing device 100 then stores and installs the downloaded App01.exe on the memory 102 (S1405). The App01.exe may be stored in association with the DI 209 (ID of the appliance 200) as depicted in FIG. 26A, or may be stored in association with the ID 209 and App Info 211 as depicted in FIG. 26B. Upon completion of the installation of the App01.exe, the portable computing device 100 enables a user interface for launch of and access to the App01.exe (S1406). The steps S1400 through S1406 may be embodied by the instructions of the APS program 108 resident on the memory 102. The automatic program setup process at the step S11 or S22 may be achieved by way of the steps S1400 through S1406, S2400, and S4400. The portable computing device 100 may automatically perform the steps S1400 through S1406 by the processor 101 executing the instructions of the APS program 108 resident on the memory 102, wherein the instructions may include: determining whether or not App01.exe is available on the memory 102 (S1400); upon determining that App01.exe is not available on the memory 102, performing a close-range wireless communication with the appliance 200 over the close-range wireless communication network 10 or 20 to send to the appliance 200 a request for the App Info 211 (S1401); receiving the App Info 211 from the appliance 200 (S1402); performing an Internet communication with the server computer 400 with reference to the URI contained the App Info 211 to send to the server computer 400 a request for download of the App01.exe (S1403); downloading the App01.exe from the server computer 400 over the Internet (S1404); storing and installing the downloaded App01.exe on the memory 102 (S1405); and enabling a user interface for launch of and access to the App01.exe (S1406). The appliance 200 may automatically perform the step S2400 by the processor 201 executing the instructions of the AO program 208 resident on the memory 202, wherein the instructions may include: sending App info 211 to the portable computing device 100 over the close-range wireless communication network 10 or 20 (S2400). The server computer 400 may automatically perform the step S4400 by the processor 401 executing the instructions of the server program 408 resident on the memory 402, wherein the instructions may include: acknowledging the request for download and streaming App01.exe to the portable computing device 100 over the Internet 40 (S4400).

In some embodiments, the portable computing device 100 automatically or autonomously fetches the App01.exe from the appliance 200 on a condition that the App01.exe resident on the server computer 400 is not available locally on the portable computing device 100. In the embodiments, as depicted in FIG. 25, the portable computing device 100 performs a close-range wireless communication with the appliance 200 over the close-range wireless communication network 10 or 20 to send to the appliance 200 a request for the App Info 211, by addressing the request to the ID 209 (S1500). In response to reception of the request, the appliance 200 performs a close-range wireless communication with the portable computing device 100 over the close-range wireless communication network 10 or 20 to send to the portable computing device 100 the App info 211 resident on the memory 202, by addressing the App info 211 to the ID 111 (S2500), so that the portable computing device 100 receives the App Info 211 over the close-range wireless communication network 10 or 20 (S1501). The portable computing device 100 then determines, with reference to the App Info 211, whether or not App01.exe stored in the server computer 400 is also stored in the portable computing device 100 (S1502). More particularly, the determination at S1502 may be made by, for example, determining whether or not an application program identified by the App Info 211 is stored on the memory 102, or checking for an application program having the same metadata such as the name, size, and version as the App info 211 on the memory 102. App info 211 is the metadata of App01.exe stored in the server computer 400, and therefore, if the determination at S1502 is affirmative, it means that the App01.exe with the same characteristics, properties, or qualities (e.g., name, size, and/or version) as the App01.exe resident in the server computer 400 is stored in the portable computing device 100, namely meaning that App01.exe stored in the server computer 400 is also stored in the portable computing device 100. If the determination at S1502 is negative, it means that the App01.exe stored in the server computer 400 is not stored in the portable computing device 100. The determination at S1502 should be negative if, for example, App01.exe had been once installed and remains on the memory 102, but App01.exe in the server computer 400 was updated to a higher version. Upon determining affirmatively at S1502 (S1502: Yes), the portable computing device 100 enables a user interface for launch of and access to the App01.exe (S1506). Upon determining negatively at S1502 (S1502: No), the portable computing device 100 downloads App01.exe from the server computer 400. More particularly, the portable computing device 100 knows the online location of App01.exe by referring to the URI associated with the App01.exe resident on the server computer 400, the URI being contained in the received App info 211, as depicted in FIG. 13. With reference to the URI, the portable computing device 100 performs an Internet communication with the server computer 400 to send to the server computer 400 a request for download of the App01.exe, by addressing the request to the URI (S1503). In response to the request, the server computer 400 acknowledges the request for download of App01.exe and streams App01.exe to the portable computing device 100 over the Internet 40 (S4500), so that the portable computing device 100 downloads the App01.exe from the server computer 400 over the Internet 40 (S1504). The portable computing device 100 then stores and installs the downloaded App01.exe on the memory 102 (S1505). The App01.exe may be stored in association with the DI 209 (ID of the appliance 200) as depicted in FIG. 26A, or may be stored in association with the ID 209 and App Info 211 as depicted in FIG. 26B. Upon completion of the installation of the App01.exe, the portable computing device 100 enables a user interface for launch of and access to the App01.exe (S1506). The steps S1500 through S1506 may be embodied by the instructions of the APS program 108 resident on the memory 102. The automatic program setup process at the step S11 or S22 may be achieved by way of the steps S1500 through S1506, S2500, and S4500. The portable computing device 100 may automatically perform the steps S1400 through S1406 by the processor 101 executing the instructions of the APS program 108 resident on the memory 102, wherein the instructions may include: performing a close-range wireless communication with the appliance 200 over the close-range wireless communication network 10 or 20 to send to the appliance 200 a request for the App Info 211 (S1500); receiving the App Info 211 from the appliance 200 (S1501); determining whether or not App01.exe stored in the server computer 400 is stored in the portable computing device 100 with reference to App info 211 (S1502); upon determining that App01.exe resident in the server computer 400 is not stored in the portable computing device 100, performing an Internet communication with the server computer 400 with reference to the URI contained the App Info 211 to send to the server computer 400 a request for download of the App01.exe (S1503); downloading the App01.exe from the server computer 400 over the Internet (S1504); storing and installing the downloaded App01.exe on the memory 102 (S1505); and enabling a user interface for launch of and access to the App01.exe (S1506). The appliance 200 may automatically perform the step S2500 by the processor 201 executing the instructions of the AO program 208 resident on the memory 202, wherein the instructions may include: sending App info 211 to the portable computing device 100 over the close-range wireless communication network 10 or 20 (S2500). The server computer 400 may automatically perform the step S4500 by the processor 401 executing the instructions of the server program 408 resident on the memory 402, wherein the instructions may include: acknowledging the request for download and streaming App01.exe to the portable computing device 100 over the Internet 40 (S4500).

Monitoring Communication: S12, S23

In some embodiments, as depicted in FIG. 27, after the user interface for launch of and access to the App01.exe is enabled, the portable computing device 100 monitors the presence of the appliance 200 on the close-range wireless communication network 10 or 20 (S2000).

Specifically, in some embodiments, the monitoring at S2000 may be made, for example, by periodically, regularly, routinely, or intermittently making the close-range wireless communication with the appliance 200 to send requests for reply, such a request as a polling and ping, to the appliance 200. The portable computing device 100 may determine that the appliance 200 is present on or connected to the communication network 10 or 20 as long as the portable computing device 100 successfully receives replies sent from the appliance 200 in response to the requests, whereas the portable computing device 100 may determine that the appliance 200 is no longer present on or connected to the communication network 10 or 20 if the portable computing device 100 fails to receive any replies from the appliance 200 for a predetermined period.

Specifically, in some embodiments, the monitoring at S2000 may be made, for example, by monitoring reception of beacon signals periodically, regularly, routinely, or intermittently sent from the appliance 200 when the portable computing device 100 and the appliance 200 are in communication with each other in the P2P manner. The portable computing device 100 may determine that the appliance 200 is present on or connected to the wireless communication network 10 or 20 as long as the portable computing device 100 successfully receives the beacon signals, whereas the portable computing device 100 may determine that the appliance 200 is no longer present on or connected to the wireless communication network 10 or 20 if the portable computing device 100 fails to receive any beacon signals for a predetermined period.

Specifically, in some embodiments, the monitoring at S2000 may be made, for example, by continuing the discovery process as mentioned above with reference to FIGS. 8 and 9. In the embodiments, the monitoring at S2000 may be made by checking for an announcement (S200) by the appliance 200 indicating that the appliance 200 is leaving the wireless communication network 10 or 20, so that the portable computing device 100 may determine that the appliance 200 is present on or connected to the wireless communication network 10 or 20 as long as failing to receive such announcement, whereas the portable computing device 100 may determine that the appliance 200 is no longer present on or connected to the wireless communication network 10 or 20 upon receiving such announcement. In the embodiments, the monitoring at S2000 may be made by periodically, regularly, routinely, or intermittently conducting the searches (S101) for the presence of the appliance 200, so that the portable computing device 100 may determine that the appliance 200 is present on or connected to the wireless communication network 10 or 20 as long as the portable computing device 100 successfully receives replies sent from the appliance 20 responsive to the searches, whereas the portable computing device 100 may determine that the appliance 200 is no longer present on or connected to the wireless communication network 10 or 20 if the portable computing device 100 fails to receive any replies for a predetermined period.

The monitoring at S2000 may continue as long as the close-range wireless communication is active as a result of the monitoring (S2001: Yes). Upon determining that the appliance 200 is no longer present on or connected to the close-range wireless communication network 10 or 20 as a result of the monitoring (S2001: No), the portable computing device 100 disables the user interface for launch of and access to the App01.exe (S2002). The communication monitoring process at the step S12 or S23 may be achieved by way of the steps S2000 through S2002. The portable computing device 100 may automatically perform the steps S2000 through S2002 by the processor 101 executing the instructions of the APS program 108 or the App01.exe resident on the memory 102, wherein the instructions may include: continuously monitoring the presence of the appliance 200 on the close-range wireless communication network 10 or 20 (S2000); determining whether or not the appliance 200 is present on or connected to the wireless communication network 10 or 20 as a result of the monitoring (S2001); and upon determining negatively at S2001 (S2001: No), disabling the user interface for launch of and access to the App01.exe (S2002). After the user interface for launch of and the access to the App01.exe is disabled (S2002), the user interface may be enabled again according to the steps S10 through S11 or S20 through S22 if the portable computing device 100 discovers the appliance 200 again.

Enablement and Disabling of User Interface: S1003, S1104, S1206, S1305, S1406, S1506, S2002

The enablement of the user interface is to enable a user to launch and access to the App01.exe through a user interface of the portable computing device 100.

In some embodiments, the enablement of user interface includes popping up or displaying an icon associated with the App01.exe on a screen on the display 106, enabling a user to select the icon through the input unit 107. The screen may be a home screen that is a graphical user interface listing icons associated with installed application programs, through which to receive a user input using the input 107 to select one of the icons to launch an application program associated with the selected icon. FIGS. 28A and 28B illustrate an embodiment of the pop up of the icon. As depicted in FIG. 28A, a home screen 60 is displayed on the display 106 for presenting application programs resident on the memory 102 by way of icons 61 each associated with a specific one of the application programs. In FIG. 28A, an icon associated with the App01.exe is not yet displayed because the user interface for launch of and access to App01.exe is not yet enabled. Then, as a result of the enablement of the user interface, an icon 62 associated with the App01.exe pops up or suddenly starts to be displayed on the home screen 60, as depicted in FIG. 28B. The icon 62 may have an eye-catching appearance distinct from the other icons 61, like shaking or blinking for a moment, upon its popup. Then, the portable computing device 100 can receive a user input using the input 107 to select the icon 62 through the home screen 60 to launch the App01.exe. In the embodiments, the disablement of the user interface may include deleting, removing, or stopping displaying the icon 62 once popped up and displayed.

In some embodiments, the enablement of the user interface includes activating an icon associated with the App01.exe on a screen on the display 106, enabling a user to select the icon through the input unit 107. The screen may be a home screen that is a graphical user interface listing icons associated with installed application programs, through which to receive a user input using the input 107 to select one of the icons to launch an application program associated with the selected icon. FIGS. 29A and 29B illustrate an embodiment of the activation of the icon. An icon 62 associated with App01.exe is preliminarily displayed on the home screen 60 but deactivated, as depicted in FIG. 29A. In other words, the icon 62 is visible but not selectable by a user because the user interface for launch of and access to App01.exe is not yet enabled. Then, as a result of the enablement of user interface, the icon 62 is made active as depicted in FIG. 29B. In other words, the icon 62 becomes selectable by a user. The icon 62 may be translucent, gray-scaled, less vivid, or displayed in another ambiguous manner when deactivated, and the icon 62 may be not translucent, not gray-scaled, or may be made more vivid when activated. The portable computing device 100 can receive a user input using the input 107 to select the active icon 62 through the home screen 60 to launch the App01.exe. In the embodiments, the disablement of the user interface may include deactivating the icon 62, namely, rendering the icon 62 unselectable.

In some embodiments, the home screen 60 may have multiple pages in a manner that a page may be added to its previous page when the number of application programs installed in the portable computing device 100 exceeds the maximum number of icons a single page is able to accommodate, leading to no more icons being able to be listed in a single page. For example, assume a single page accommodates up to twelve icons, a page needs to be added when thirteen or more application programs are installed for the home screen 60 to list thirteen or more icons. When the home screen 60 have multiple pages, only a single page is displayed on the display 106 so that a user can see just icons listed in a single page, and thus a user typically needs to manually switch pages to navigate to his/her desirable icons using the input unit 107. In the embodiments, the enablement of the user interface includes: determining whether or not the page accommodating the icon associated with App01.exe is displayed on the display 106; and maintaining the display of the page upon determining positively, whereas, upon determining negatively, automatically switching pages to display the page accommodating the icon associated with App01.exe on the display 106 so that the icon can be easily accessible to the user, without the need of the user manually switching pages to navigate to the icon associated with App01.exe. FIG. 30 illustrates an embodiment of the page switching. According to an example illustrated in FIG. 30, the home screen 60 has page 1 of the home listing icons none of which is associated with App01.exe, and page 2 having the icon 62 associated with App01.exe among the listed icons. The enablement of the user interface may include: determining whether or not the page 2 is being displayed on the display 106; and maintaining the display of the page 2 upon determining that the page 2 is being displayed, whereas automatically switching the pages to display the page 2 on the display 106. In the embodiments, the disablement of the user interface my include deleting or removing the icon 62 out of the page 2, deactivating the icon 62 by rendering the icon 62 unselectable, or automatically switching back the pages to display the page 1 again on the display 106.

In some embodiments, the enablement of the user interface includes activating an icon associated with the App01.exe on a screen on the display 106, enabling a user to select the icon through the input unit 107. The screen may be a home screen that is a graphical user interface listing icons associated with installed application programs, through which to receive a user input using the input 107 to select one of the icons to launch an application program associated with the selected icon. FIGS. 31A through 31C illustrate an embodiment of the activation of the icon. An icon associated with App01.exe does not appear on the home screen 60 as long as the appliance 200 is discovered according to the step S10, as depicted in FIG. 31A. Upon or in response to discovery of the appliance 200 according to the step S10, an icon 62 associated with App01.exe is popped up or displayed on the home screen 60 with a first appearance but still deactivated, as depicted in FIG. 31B. In other words, the icon 62 is visible with the first appearance but not selectable by a user. The appearance herein may be the outward look or aspect, such as the color, brightness, contrast, pattern, shape, and motion. After the icon 62 is displayed with the first appearance, upon or in response to the enablement of user interface, the icon 62 is displayed with a second appearance that is distinctive from the first appearance, as depicted in FIG. 31C. The icon 62 is made activated upon being displayed with the second appearance, meaning that the icon 62 becomes selectable by a user to launch App01.exe upon being displayed with the second appearance. The icon 62 may be translucent, gray-scaled, less vivid, or displayed in an ambiguous manner while deactivated, and the icon 62 may be not translucent, not gray-scaled, or may be made more vivid when activated. The portable computing device 100 can receive a user input using the input 107 to select the active icon 62 through the home screen 60 to launch the App01.exe. In the embodiments, the disablement of the user interface may include deactivating the icon 62, namely, rendering the icon 62 unselectable and changing the appearance of the icon 62 into the first appearance from the second appearance. Alternatively, the displayed icon 62 may be deleted or removed, resulting in the condition as depicted in FIG. 31A, upon the disablement of the user interface.

Figures 32A, 32B:
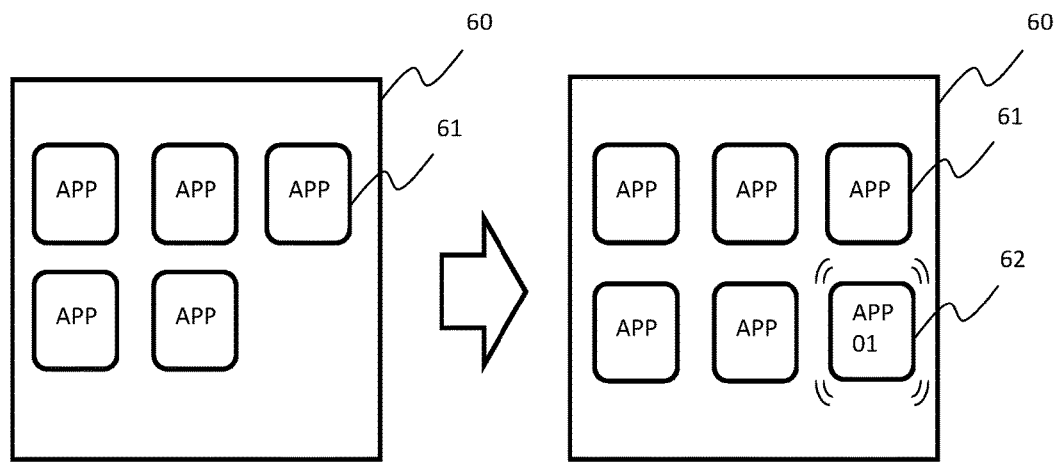
Figures 32C, 32D:
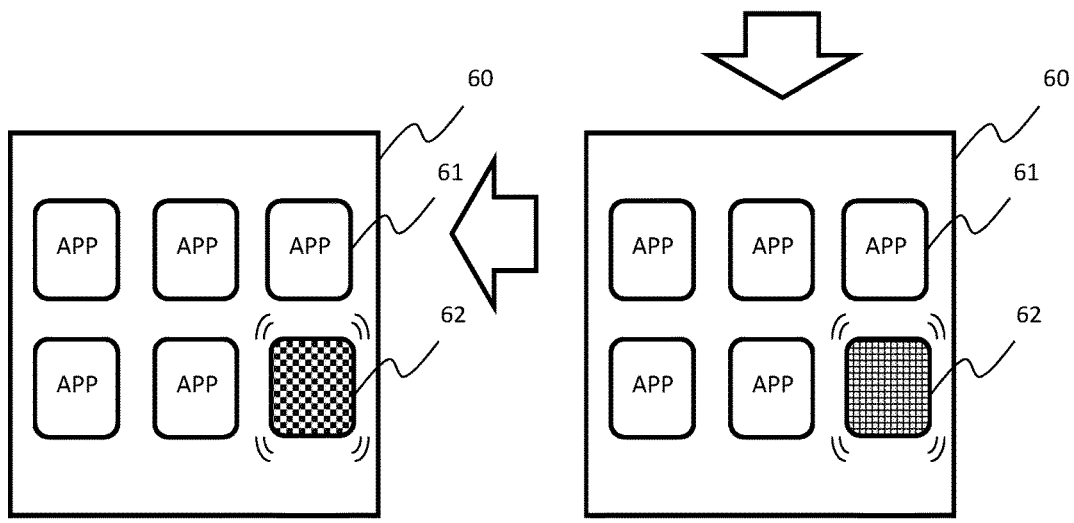

In some embodiments, the enablement of the user interface includes activating an icon associated with the App01.exe on a screen on the display 106, enabling a user to select the icon through the input unit 107. The screen may be a home screen that is a graphical user interface listing icons associated with installed application programs, through which to receive a user input using the input 107 to select one of the icons to launch an application program associated with the selected icon. FIGS. 32A through 32D illustrate an embodiment of the activation of the icon. An icon associated with App01.exe does not appear on the home screen 60 as long as the appliance 200 is discovered according to the step S20, as depicted in FIG. 32A. Upon or in response to discovery of the appliance 200 according to the step S20, an icon 62 associated with App01.exe is popped up or displayed on the home screen 60 with a first appearance but still deactivated, as depicted in FIG. 32B. In other words, the icon 62 is visible with the first appearance but not selectable by a user. The appearance herein may be the outward look or aspect, such as the color, brightness, contrast, pattern, shape, and motion. After the icon 62 is displayed with the first appearance, upon or in response to successful authentication according to the step S21, the icon 62 is displayed with a second appearance distinctive from the first appearance, namely, is changed in its appearance into the second appearance, as depicted in FIG. 32C. The icon 62 is still deactivated when displayed with the second appearance. Ultimately, after the icon 62 is displayed with the second appearance, upon or in response to the enablement of user interface, the icon 62 is displayed with a third appearance that is distinctive from both of the first and second appearances, as depicted in FIG. 32D. The icon 62 is made activated upon being displayed with the third appearance, meaning that the icon 62 becomes selectable by a user to launch App01.exe upon being displayed with the third appearance. The icon 62 may be translucent, gray-scaled, less vivid, or displayed in an ambiguous manner while deactivated, and the icon 62 may be not translucent, not gray-scaled, or may be made more vivid when activated. The portable computing device 100 can receive a user input using the input 107 to select the active icon 62 through the home screen 60 to launch the App01.exe. In the embodiments, the disablement of the user interface may include deactivating the icon 62, namely, rendering the icon 62 unselectable and changing the appearance of the icon 62 into the first or second appearance from the third appearance. Alternatively, the displayed icon 62 may be deleted or removed, resulting in the condition as depicted in FIG. 32A, upon the disablement of the use interface.

In some embodiments, the enablement of the user interface includes activating the microphone 109 so that the portable computing device 100 receives a user voice command to launch App01.exe through the microphone 109. The user voice command may be a user's speech such as "Okay. Open App01.exe" in response to which the portable computing device 100 launches App01.exe using voice recognition techniques known to those skilled in the art. In the embodiments, the disablement of the user interface includes deactivating the microphone 109 so that the portable computing device 100 no longer responds to the user's speech input thorough the microphone 109.

Communication between App01.exe and AO Program

FIG. 33 is a diagram schematically illustrating communication between App01.exe and AO program 208, in some embodiments. In the embodiments, App01.exe is programmed, designed, or configured to communicate with AO program 208 over at least one of uplink channel and downlink channel of a communication over the close-range wireless communication, by including computer program instructions for doing so. Similarly, AO program 208 is programmed, designed, or configured to communicate with App01.exe over at least the other one of the uplink channel and downlink channel of the communication over the close-range wireless communication, by including computer program instructions for doing so. App01.exe may be programmed, designed, or configured to: receive a user input from the input 107 and/or a user voice command input from the microphone 109 to request control of the appliance 200; and then generate a command corresponding to the request for the control. App01.exe may be programmed, designed, or configured to send the command to the AO program 208 over the close-range wireless communication. The AO program 208 may be programmed, designed, or configured to control the appliance unit 204 in response to the command sent by App01.exe. The AO program 208 may be programmed, designed, or configured to monitor the operations and/or status of the appliance unit 204 to generate data corresponding to or indicative of the result of the monitoring. The AO program 208 may be programmed, designed, or configured to send the data to App01.exe over the close-range wireless communication. App01.exe may be programmed, designed, or configured to display a graphical user interface on the display 106 and/or output an audible notification through the loudspeaker 108, through which to notify the result of a user, in response to the data sent by the AO program 208.

Exemplary Embodiments of Appliance 200

In some embodiments, the appliance 200 is a television set that is typically configured to receive television video signals on one or more television channels through an antenna and play back video and audio corresponding to a selected channel. In the embodiments, App01.exe and AP program 208 may include computer program instructions respectively for communication with one another to allow the portable computing device 100 to monitor and/or control the operation and/or status of the television set 200. The monitor may include: monitoring what channel is being played back; and monitoring the volume of audio played back. The control may include: specifying the television channel to be played back; changing the volume; displaying an electronic program guide (EPG) stored on the television set 200 on the display 106.

In some embodiments, the appliance 200 is a storage device configured to store data such as video data, audio data, text data, and/or the likes on a medium disposed within or connected to the storage device 200. The storage device may be referred to as a video recorder when the device is for storing video data. The storage medium may be a hard disk drive (HDD), a Blu-ray disc, a digital versatile disc (DVD), a solid-state disc(SSD), a silicon memory card, or the like having capacity on which data is recorded in a form of a data file electrically, magnetically, optically, or in other technical manners. In the embodiments, App01.exe and AO program 208 may include program instructions respectively for communication with one another to allow the portable computing device 100 to monitor and/or control the operation and/or status of the storage device 200. The monitor may include: monitoring the capacity of the medium; and listing data stored on the medium on the display 106. The control may include copying, moving, and/or deleting data on the medium.

In some embodiments, the appliance 200 is a media player configured to play back a media file resident on a medium disposed within or connected to the media player 200. The storage medium may be a CD (Compact Disc), DVD (Digital Versatile Disc), BD (Blu-ray Disc), flash memory card, cassette or the like. The media player may be referred to also as a CD player, DVD player, BD player, radio-cassette player, boom box, etc. depending on the medium and/or other aspects. In the embodiments, App01.exe and AO program 208 may include program instructions respectively for communication with one another to allow the portable computing device 100 to monitor and/or control the operation and/or status of the media player 200. The monitor may include: monitoring the capacity of the medium; and listing media files stored on the medium on the display 106. The control may include: copying, moving, and/or deleting media files on the medium; playing back the media files; and pausing, stopping, fast-forwarding, and rewinding the playback.

In some embodiments, the appliance 200 is a telephone set. In the embodiments, App01.exe and AO program 208 may include program instructions respectively for communication with one another to allow the portable computing device 100 to monitor and/or control the operation and/or status of the telephone set 200. The monitor may include: monitoring a phone call history in the telephones set 200; and monitoring messages recorded on a medium via an answering machine function in the telephone set 200. The control may include: deleting the phone call history in the telephone set 200; and playing back and deleting the recorded messages.

In some embodiments, the appliance 200 is an amplifier configured to amplify input signals such as audio signals. In the embodiments, App01.exe and AO program 208 may include program instructions respectively for communication with one another to allow the portable computing device 100 to monitor and/or control the operation and/or status of the amplifier 200. The monitor may include: monitoring how much the input signals are being amplified by the amplifier 200. The control may include: turning up and down the amplification.

In some embodiments, the appliance 200 is a radio tuner configured to receive radio signals on one or more channels through an antenna and play back audio corresponding to a selected channel. In the embodiments, App01.exe and AO program 208 may include program instructions respectively for communication with one another to allow the portable computing device 100 to monitor and/or control the operation and/or status of the radio tuner 200. The monitor may include: monitoring what channel is being played back; and monitoring the volume of audio played back. The control may include: specifying the channel to be played back; and changing the volume.

In some embodiments, the appliance 200 is a clothes iron for ironing or pressing clothes by heat. In the embodiments, App01.exe and AO program 208 may include program instructions respectively for communication with one another to allow the portable computing device 100 to monitor and/or control the operation and/or status of the iron 200. The monitor may include: monitoring the ironing temperature of the iron 200; and monitoring the amount of water in a water tank of the iron 200 with respect to the tank capacity. The control may include turning on and off the iron 200.

In some embodiments, the appliance 200 is an electric shaver. In the embodiments, App01.exe and AO program 208 may include program instructions respectively for communication with one another to allow the portable computing device 100 to monitor and/or control the operation and/or status of the electric shaver 200. The monitor may include: monitoring the consumption of a battery of the shaver 200; and monitoring the recommendation for a razor renewal or replacement provided based on the total time period for which the shaver 200 has been operated with an existing razor on. The control may include: turning on and off the shaver 200.

In some embodiments, the appliance 200 is an electric toothbrush for clearing teeth by vibration of a brush. In the embodiments, App01.exe and AO program 208 may include program instructions respectively for communication with one another to allow the portable computing device 100 to monitor and/or control the operation and/or status of the electric toothbrush 200. The monitor may include: monitoring the consumption of a battery of the toothbrush 200; and monitoring the recommendation for renewal or replacement of a disposal brush of the toothbrush 200 provided based on the total time period for which the toothbrush 200 has been operated with an existing brush on. The control may include: turning on and off the toothbrush 200.

In some embodiments, the appliance 200 is an electric vacuum cleaner with one or more sensors operative to detect the operation and/or status of components of the vacuum cleaner. In the embodiments, App01.exe and AO program 208 may include program instructions respectively for communication with one another to allow the portable computing device 100 to monitor and/or control the operation and/or status of the vacuum cleaner 200. The monitor may include: monitoring the amount of dust in a dust bin in the vacuum cleaner 200 detected by the sensors with respect to the dust bin capacity. The control may include turning on and off the vacuum cleaner 200; and changing the vacuuming power.

In some embodiments, the appliance 200 is an electric washing machine with one or more sensors operative to detect the operation and/or status of components of the washing machine 200. In the embodiments, App01.exe and AO program 208 may include program instructions respectively for communication with one another to allow the portable computing device 100 to monitor and/or control the operation and/or status of the washing machine 200. The monitor may include: monitoring the amount of detergent in a dispenser of the washing machine 200 detected by the sensors; monitoring whether the door of the washing machine 200 is open or closed; monitoring how much time it needs until completion of washing; monitoring the setting of a timer to set time at which the washing machine 200 starts washing; and monitoring how dirty a tub of the washing machine 200 is. The control may include turning on and off the washing machine 200; and adjusting the setting of the timer.

In some embodiments, the appliance 200 is a refrigerator with one or more sensors operative to detect the operation and/or status of the refrigerator 200. In the embodiments, App01.exe and AO program 208 may include program instructions respectively for communication with one another to allow the portable computing device 100 to monitor and/or control the operation and/or status of the refrigerator 200. The monitor may include: monitoring the temperature within one or more food compartment of the refrigerator 200 detected by the sensors; and monitoring whether a door of the refrigerator 200 is open or closed. The control may include adjusting the temperature within the compartments by cooling down the compartments more or less.

In some embodiments, the appliance 200 is a kitchen oven with one or more sensors operative to detect the operation and/or status of the kitchen oven 200. In the embodiments, App01.exe and AO program 208 may include program instructions respectively for communication with one another to allow the portable computing device 100 to monitor and/or control the operation and/or status of the oven 200. The monitor may include: monitoring the temperature, detected by the sensors, within a compartment of the oven 200 heated by a heating source such as a microwave generator, induction heater, and burner; monitoring whether the door of the oven 200 is open or closed; and monitoring the progress of a timer for timing the time period for which the oven 200 is to operate when the timer is running. The control may include adjusting the temperature within the compartment by turning up and down the heating source; and turning on and off the oven 200.

In some embodiments, the appliance 200 is an air conditioner with one or more sensors operative to detect the operation and/or status of the air conditioner 200. In the embodiments, App01.exe and AO program 208 may include program instructions respectively for communication with one another to allow the portable computing device 100 to monitor and/or control the operation and/or status of the oven 200. The monitor may include: monitoring a target temperature setting according to which the air conditioner 200 operates to cool down or heat up the room temperature; monitoring the setting of a timer to set time at which the air conditioner 200 starts or stops operating; and monitoring whether the air conditioner 200 is operating in a cooler mode or a heater mode. The control may include adjusting the target temperature setting; chaining the operation mode between the cooler mode and heater mode; adjusting the setting of the timer; and turning on and off the air conditioner 200.

In some embodiments, the appliance 200 is a dish washer with one or more sensors operative to detect the operation and/or status of the dish washer 200. In the embodiments, App01.exe and AO program 208 may include program instructions respectively for communication with one another to allow the portable computing device 100 to monitor and/or control the operation and/or status of the dish washer 200. The monitor may include: monitoring the amount of detergent in a dispenser of the dish washer 200 detected by the sensors; monitoring whether the door of the dish washer 200 is open or closed; monitoring how much time it needs until completion of washing; monitoring the setting of a timer to set time at which the dish washer 200 starts; and monitoring how dirty a compartment of the dish washer 200 is. The control may include turning on and off the washing machine 200; and adjusting the setting of the timer.

In some embodiments, the appliance 200 is a surveillance camera. In the embodiments, App01.exe and AO program 208 may include program instructions respectively for communication with one another to allow the portable computing device 100 to monitor and/or control the operation and/or status of the surveillance camera 200. The monitor may include: monitoring the setting of the camera 200 for capturing images such as the camera angle and the zoom level that indicates how much an optical or digital zoom is performed by the camera 200; and monitoring the capacity of a medium of the camera 200 on which the camera 200 records captured images. The control may include requesting for and displaying the images captured and/or recorded by the camera 200; controlling the zoom level for the optical or digital zoom; and turning on and off the camera 200.

In some embodiments, the appliance 200 is a lighting device with a lighting source, which may be referred to also as a lamp. In the embodiments, App01.exe and AO program 208 may include program instructions respectively for communication with one another to allow the portable computing device 100 to monitor and/or control the operation and/or status of the lighting device 200. The monitor may include: monitoring the property, such as intensity and color of light, that may be dynamically controlled by the lighting source; and monitoring the total time period for which the lighting device 200 has been turned on. The control may include controlling the property of light by the lighting source; and turning on and off the lighting device 200.

In some embodiments, the appliance 200 is a wireless microphone system with one or more microphones and/or one or more tuners. In the embodiments, App01.exe and AO program 208 may include program instructions respectively for communication with one another to allow the portable computing device 100 to monitor and/or control the operation and/or status of the microphone system 200. The monitor may include: monitoring the setting of channels on which the microphones transmit voice data; and monitoring the battery consumption of battery in the microphones. The control may include performing channel setting to set channels on which the microphones transmit voice data; and turning on and off the microphones.

In some embodiments, the appliance 200 is a vending machine for vending products such as drink bottles and cigarette boxes. In the embodiments, App01.exe and AO program 208 may include program instructions respectively for communication with one another to allow the portable computing device 100 to monitor and/or control the operation and/or status of the vending machine 200. The monitor may include: monitoring the inventory of the products and the prices of the products stocked in the vending machine 200 to list the inventory with the prices on the display 106; and monitoring the temperature setting to set temperature at which the products are cooled by a refrigerator and/or heated by a heater. The control may include: forwarding to the vending machine 200 a purchase order to purchase a product responsive to a user input using the input 107 to select the product out of the inventory listed on the display 106; adjusting the temperature setting; and turning on and off the vending machine 200.

In some embodiments, the appliance 200 is a parking meter installable, for example, on a street. In the embodiments, App01.exe and AO program 208 may include program instructions respectively for communication with one another to allow the portable computing device 100 to monitor and/or control the operation and/or status of the parking meter 200. The monitor may include: monitoring the vacancy or occupancy of the parking meter 200; and monitoring the fee necessary to use the parking meter 200. The control may include: reserving the parking meter 200; purchasing a parking ticket for the parking meter 200 by, for example, making an online payment; and turning on and off the parking meter 200.

In some embodiments, the appliance 200 is a copier configured to scan a document and make one or more copies of the document using papers stored in a paper feeder. In the embodiments, App01.exe and AO program 208 may include program instructions respectively for communication with one another to allow the portable computing device 100 to monitor and/or control the operation and/or status of the copier 200. The monitor may include: monitoring the content of a scanned document to display the content on the display 106; monitoring the copy setting such as the numbers of copies to be made by the copier 200 to display the setting on the display 106; and monitoring the number of paper sheets stored in the feeder of the copier 200. The control may include: adjusting the copy setting; and turning on and off the copier 200.

In some embodiments, the appliance 200 is a printer configured to print out a document based on document data sent from a user's computing device, such as the portable computing device 100, via network using papers stored in a paper feeder. In the embodiments, App01.exe and AO program 208 may include program instructions respectively for communication with one another to allow the portable computing device 100 to monitor and/or control the operation and/or status of the printer 200. The monitor may include: monitoring the document data received by the printer 200 to list printout jobs based on the document data on the display 106; monitoring the printout setting such as the numbers of prints to be made by the printer 200 to display the setting on the display 106; and monitoring the number of paper sheets stored in the feeder of the printer 200. The control may include: adjusting the printout setting; cancelling the printout jobs; and turning on and off the printer 200.

In some embodiments, the appliance 200 is a sensor operative to detect, gauge, and/or measure the presence, intensity, quality, etc. of a tangible or intangible target such as heat, light, temperature, humidity, sound, odor, speed, weight, height, and distance. In the embodiments, App01.exe and AO program 208 may include program instructions respectively for communication with one another to allow the portable computing device 100 to monitor and/or control the operation and/or status of the sensor 200. The monitor may include: monitoring the result of the detection, gauging, and/or measurement by the sensor 200 to display the result on the display 106; and monitoring the setting according to which the sensor 200 operates. The control may include: adjusting the setting; and turning on and off the sensor 200.

In some embodiments, the appliance 200 is an automobile. In the embodiments, App01.exe and AO program 208 may include program instructions respectively for communication with one another to allow the portable computing device 100 to monitor and/or control the operation and/or status of the automobile 200. The monitor may include: monitoring various information related to the status and/or operation of the automobile 200, such as the consumption of gasoline in a gasoline tank or battery of the automobile 200, the total mileage, the current speed, and the setting of an air conditioner, retrieved from an electronic control unit (ECU) or other electronic components including a processing unit and one or more sensors of the automobile 200, to display the information on the display 106. The control may include: locking and unlocking one or more doors of the automobile 200; turning on and off the engine of the automobile 200; steering the automobile 200; accelerating and deaccelerating the automobile 200; and communicating commands to the ECU to cause the automobile 200 to perform other operations.

The appliance 200 may be in any form without limitation to the above-mentioned embodiments. In various embodiments, App01.exe and AO program 208 may include program instructions respectively for communication with one another to allow the portable computing device 100 to monitor and/or control the operation and/or status of the appliance 200. The monitor may include: monitoring the status of one or more components or elements of the appliance 200 for display of the status in any way on the display 106. The control may include: sending commands to the appliance 200 for control, such as activation and deactivation, of the components or elements of the appliance 200.

The remote control of an appliance, electronic devices, vehicles, etc. by a separate mobile user device using wireless communication are disclosed, for example, by the following U.S. patent publications, the contents of which are incorporated herein by reference in their entireties:

U.S. patent application publication No. 2012/0159546 filed on Feb. 27, 2012
U.S. patent application publication No. 2005/0159823 filed on Jan. 31, 2005
U.S. patent application publication No. 2009/0254778 filed on Apr. 9, 2009
U.S. patent application publication No. 2009/0298535 filed on Jun. 2, 2008
U.S. patent application publication No. 2014/0172197 filed on Dec. 13, 2013
U.S. patent application publication No. 2004/0133319 filed on Oct. 10, 2003
U.S. patent application publication No. 2014/0293753 filed on Apr. 2, 2014
U.S. patent application publication No. 2017/0024123 filed on Oct. 10, 2016
U.S. patent application publication No. 2013/0052946 filed on Aug. 23, 2011
U.S. issued Pat. No. 8,341,318 filed on Mar. 9, 2010
U.S. patent application publication No. 2014/0159877 filed on Dec. 7, 2012
U.S. patent application publication No. 2014/0358705 filed on Jan. 23, 2014
U.S. patent application publication No. 2014/0179231 filed on Dec. 26, 2012
U.S. patent application publication No. 2017/0032584 filed on Jul. 29, 2016

Note

Further modifications and alternative embodiments will be apparent to those skilled in the art in view of this disclosure. Accordingly, the above description is to be construed as illustrative only and is for the purpose of teaching those skilled in the art a manner of carrying out the invention. It is to be understood that the forms of the invention herein shown and described are to be taken as exemplary embodiments. Various modifications may be made without departing from the scope of the invention. For example, equivalent elements or materials may be substitute for those illustrated and described herein, and certain features of the invention may be utilized independently of the use of other features, all as would be apparent to one skilled in the art after having the benefit of this description of the invention. In addition, the terms "a" and "an" are generally used in the present disclosure to mean one or more.

What is claimed is:

1. A computer program product for a portable computing device, the computer program product including instructions that cause a processor of the portable computing device to perform operations comprising:

displaying a home screen on a display of the portable computing device, the home screen being configured to display icons associated with respective apps installed on the portable computing device in a selectable form, allowing a user of the portable computing device to launch an app by selecting a corresponding icon;

performing a discovery process to discover an appliance which is present within a range of a close-range wireless communication network in which the portable computing device is present, wherein the portable computing device and the appliance are individually identified by discrete identifiers in the close-range wireless communication network;

in displaying the home screen, disabling display of a first icon associated with a first app in the selectable form on the home screen even if the first app has been installed on the portable computing device when the appliance is not being discovered over the close-range wireless communication network despite the performance of the discovery process, wherein the first app is configured to communicate with appliance over the close-range wireless communication network for monitor and/or control of the appliance; and in displaying the home screen, enabling display of the first icon in the selectable form on the home screen when the appliance is being discovered over the close-range wireless communication network.

2. A portable computing device, comprising:

communication circuitry for a close-range wireless communication with an appliance over a close-range wireless communication network, wherein the portable computing device and the appliance are individually identified by discrete identifiers in the close-range wireless communication network;

an input device;

a memory;

a processor; and a computer program stored on the memory including instructions that cause the processor to perform operations comprising:

displaying a home screen on a display of the portable computing device, the home screen being configured to display icons associated with respective apps installed on the portable computing device in a selectable form, allowing a user of the portable computing device to launch an app by selecting a corresponding icon using the input device;

performing a discovery process to discover the appliance which is present in a range of the close-range wireless communication network in which the portable computing device is present;

in displaying the home screen, disabling display of a first icon associated with a first app in the selectable form on the home screen even if the first app has been installed on the portable computing device when the appliance is not being discovered over the close-range wireless communication network despite the performance of the discovery process, wherein the first app is configured to communicate with appliance over the close-range wireless communication network for monitor and/or control of the appliance; and in displaying the home screen, enabling display of the first icon in the selectable form on the home screen when the appliance is being discovered over the close-range wireless communication network.

3. The portable computing device according to claim 2, wherein:

the first app is preliminary stored on the appliance in order for the portable computing device to download the first app from the appliance over the close-range wireless communication network when the first app is not installed on the portable computing device.

4. The portable computing device according to claim 2, wherein:

the operations further comprise, in response to discovering the appliance over the close-range wireless communication network, identifying the first app installed on the portable computing device;

enabling display of the first icon comprises displaying the first icon representing the identified first app in the selectable form;

the operations further comprise, after the enablement of the first icon, continuously monitoring the close-range wireless communication to determine whether the portable computing device is in communication with the appliance over the close-range wireless communication network; and disabling display of the first icon comprises, in response to determining that the portable computing device is no longer in communication with the appliance over the close-range wireless communication network, terminating the display of first icon in the selectable form.

5. The portable computing device according to claim 4, wherein:

the first app is preliminary stored on the appliance in order for the portable computing device to download the first app from the appliance over the close-range wireless communication network; and identifying the first app comprises:

in response to discovering the appliance over the close-range wireless communication network, determining whether an app associated with the appliance is installed on the portable computing device;

in response to determining affirmatively that an app associated with the appliance is installed on the portable computing device, identifying the determined app as the first app; and in response to determining negatively that any app associated with the appliance in not installed on the portable computing device, downloading the first app from the appliance over the close-range wireless communication network, installing the downloaded first app on the portable computing device, and identifying the installed app as the first app.

6. The portable computing device according to claim 4, wherein:

the first app is preliminary stored on the appliance in order for the portable computing device to download the first app from the appliance over the close-range wireless communication network, wherein the first app is identified by a first identifier; and identifying the first app comprises:

in response to discovering the appliance over the close-range wireless communication network, obtaining the first identifier from the appliance over the close-range wireless communication network, and determining whether an app identified by the first identifier is installed on the portable computing device with reference to the obtained first identifier;

in response to determining affirmatively that an app identified by the first identifier is installed on the portable computing device, identifying the determined app as the first app; and in response to determining negatively that any app identified by the first identifier in not installed on the portable computing device, downloading the first app from the appliance over the close-range wireless communication network, installing the downloaded first app on the portable computing device, and identifying the installed app as the first app.

7. The portable computing device according to claim 4, wherein:

the first app is preliminary stored on an online server accessible by the portable computing device over the Internet in order for the portable computing device to download the first app from the online server over the Internet;

a first universal resource identifier (URI) that identifies the online server is preliminarily stored on the appliance;

identifying the first app comprises:

in response to discovering the appliance over the close-range wireless communication network, determining whether an app associated with the appliance is installed on the portable computing device;

in response to determining affirmatively that an app associated with the appliance is installed on the portable computing device, identifying the determined app as the first app; and in response to determining negatively that any app associated with the appliance in not installed on the portable computing device, obtaining the first URI from the appliance over the close-range wireless communication network, downloading the first app from the online server over the Internet with reference to the obtained first URI, installing the downloaded first app on the portable computing device, and identifying the installed app as the first app.

8. The portable computing device according to claim 4, wherein:

the first app is preliminary stored on an online server accessible by the portable computing device over the Internet in order for the portable computing device to download the first app from the online server over the Internet, wherein the first app is identified by a first identifier;

a first universal resource identifier (URI) that identifies the online server and the first identifier are preliminarily stored on the appliance;

identifying the first app comprises:

obtaining the first identifier and the first URI from the discovered appliance over the close-range wireless communication network;

in response to discovering the appliance over the close-range wireless communication network, determining whether an app identified by the first identifier is installed on the portable computing device with reference to the obtained first identifier;

in response to determining affirmatively that an app identified by the first identifier is installed on the portable computing device, identifying the determined app as the first app; and in response to determining negatively that any app identified by the first identifier in not installed on the portable computing device, downloading the first app from the online server over the Internet with reference to the obtained first URI, installing the downloaded first app on the portable computing device, and identifying the installed app as the first app.

9. The portable computing device according to claim 2, wherein:

enabling display of the first icon comprises displaying the first icon in the selectable form on the home screen; and disabling display of the first icon comprises removing the first icon off the home screen.

10. The portable computing device according to claim 2, wherein:

enabling display of the first icon comprises displaying the first icon in the selectable form that has a first appearance on the home screen; and disabling display of the first icon comprises displaying the first icon in an unselectable form that has a second appearance instead of the first appearance on the home screen, wherein the second appearance is less vivid than the first appearance.

11. The portable computing device according to claim 2, wherein:

the operations further comprise, in response to discovering the appliance over the close-range wireless communication network as a result of the performance of the discovery process, determining whether the portable computing device is authorized to use the first app for monitor and/or control of the appliance;

enabling display of the first icon comprises displaying the first icon only upon determining that the portable computing device is authorized to use the first app for monitor and/or control of the appliance; and disabling display of the first icon comprises disabling display of the first icon even if the appliance is discovered over the close-range wireless communication network, upon determining that the portable computing device is not authorized to use the first app.

12. The portable computing device according to claim 11, wherein:

the appliance stored therein an authentication database listing one or more positive IDs identifying respective authorized devices each of which is authorized to monitor and/or control the appliance using the first app; and determining whether the portable computing device is authorized to use the first app comprises, in response to discovering the appliance over the close-range wireless communication network, obtaining the positive IDs from the appliance over the close-range wireless communication network and determining whether an ID of the portable computing device matches one of the positive IDs.

13. The portable computing device according to claim 11, wherein:

a remote server accessible by the portable computing device over the Internet stores therein the first app and an authentication database listing one or more positive IDs identifying authorized devices each of which is authorized to monitor and/or control the appliance using the first app;

determining whether the portable computing device is authorized to use the first app comprises, in response to discovering the appliance over the close-range wireless communication network, obtaining the positive IDs from the remote server over the Internet and determining whether an ID of the portable computing device matches one of the positive IDs.

14. The portable computing device according to claim 11, wherein each positive ID corresponds to a specific identification as a subscriber on a cellular network.

15. The portable computing device according to claim 11, wherein each positive ID is one of International Mobile Subscriber Identity (IMSI) used to identify the portable computing device as a subscriber on a cellular network; Integrated Circuit Card Identifier (ICCID) used to identify a Subscriber Identification Module (SIM) card coupled to the portable computing device; International Mobile Equipment Identity (IMEI) used to identify the portable computing device; and Mobile Subscriber Integrated Services Digital Network Number (MSISDN) used to identify a phone number on a cellular network.

16. The portable computing device according to claim 11, wherein each positive ID is indicative of a specific user account that is issued by an online service provider to the user of the portable computing device.

17. An appliance, comprising:

communication circuitry for a close-range wireless communication with a portable computing device over a close-range wireless communication network, wherein the portable computing device and the appliance are individually identified by discrete identifiers in the close-range wireless communication network;

a memory storing at least one of (a) an first app and (b) first app information indicative of a uniform resource identifier (URI) that locates the first app resident on a remote server accessible by the portable computing device over the Internet, wherein the first app is configured to be installed and run on the portable computing device to communicate with the appliance over the close-range wireless communication network for monitor and/or control of the appliance; and a processor; and a computer program including instructions that cause the processor to perform operations comprising:

performing a discovery process to discover the portable computing device which is present in a range of the close-range wireless communication network in which the appliance is present; and responding to at least one of first and second requests issued by the discovered portable computing device over the close-range wireless communication network, wherein:

the first request is a request associated with the first app that the portable computing device is configured to issue in response to determining that the first app is not installed on the portable computing device upon discovering the appliance over the close-range wireless communication network, and responding to the first request includes sending to the portable computing device an acknowledgement of download of the first app in response to which the portable computing device downloads the first app from the appliance over the close-range wireless communication network to install the first app on the portable computing device; and the second request is a request associated with the first app information that the portable computing device is configured to issue in response to determining that the first app is not installed on the portable computing device upon discovering the appliance over the close-range wireless communication network, and responding to the second request includes sending to the portable computing device the first app information with reference to which the portable computing device establishes an Internet communication with the remote server to download the first app from the remote server over the Internet and then install the first app on the portable computing device.

18. The appliance according to claim 17, wherein:

the memory stores the first app and second app information, the second app information being indicative of an identity of the app;

responding to at least one of the first and second requests includes responding to the first request and a third request issued by the portable computing device; and the third request is a request associated with the second app information that the portable computing device is configured to issue prior to the first request, and responding to the third request includes sending to the portable computing device the second app information with reference to which the portable computing device determines if the first app is already installed on the portable computing device and issues the first request only upon determining negatively.

19. The appliance according to claim 17, wherein:

the memory stores the first app information and second app information, the second app information being indicative of an identity of the app;

responding to at least one of the first and second requests includes responding to the second request and a third request issued by the portable computing device; and the third request is a request associated with the second app information that the portable computing device is configured to issue prior to the second request, and responding to the third request includes sending to the portable computing device the second app information with reference to which the portable computing device determines if the first app is already installed on the portable computing device and issues the second request only upon determining negatively.

* * * * *